US010929889B1

(12) United States Patent
Aggarwal et al.

(10) Patent No.: US 10,929,889 B1
(45) Date of Patent: Feb. 23, 2021

(54) PROMOTION OFFERING SYSTEM

(71) Applicant: Groupon, Inc., Chicago, IL (US)

(72) Inventors: Amit Aggarwal, Palo Alto, CA (US);
Suneel Gupta, Palo Alto, CA (US);
Jeffrey Alan Holden, Palo Alto, CA (US);
Dan Nawara, Palo Alto, CA (US);
David Thacker, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 98 days.

(21) Appl. No.: 13/829,581

(22) Filed: Mar. 14, 2013

Related U.S. Application Data

(60) Provisional application No. 61/695,857, filed on Aug. 31, 2012.

(51) Int. Cl.
*G06Q 30/02* (2012.01)

(52) U.S. Cl.
CPC .............................. *G06Q 30/0269* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 7,595,725 B1* | 9/2009 | Joseph | ................... | G06Q 30/02 340/539.2 |
| 2002/0099606 A1* | 7/2002 | Shlagman | ............. | G06Q 30/02 705/14.58 |
| 2004/0103017 A1* | 5/2004 | Reed | ...................... | G06Q 30/02 705/7.31 |
| 2008/0154714 A1* | 6/2008 | Liu | ......................... | G06Q 30/02 705/14.25 |
| 2009/0150218 A1* | 6/2009 | Brunner et al. | ................. | 705/10 |
| 2009/0271266 A1* | 10/2009 | Regmi | ............... | G06Q 30/0235 705/14.44 |
| 2011/0035284 A1* | 2/2011 | Moshfeghi | ............. | G06Q 30/02 705/14.58 |
| 2012/0166267 A1* | 6/2012 | Beatty et al. | .............. | 705/14.21 |
| 2013/0124323 A1* | 5/2013 | Meyer | ................ | G06Q 30/0259 705/14.58 |
| 2013/0173659 A1* | 7/2013 | Wang | .................. | G06F 16/3331 707/769 |
| 2013/0179239 A1* | 7/2013 | Patel | .................. | G06Q 30/0207 705/14.1 |

OTHER PUBLICATIONS

Evaluate the Result of Consumer to Consumer Site Promotion Using Correspondence Analysis, LiYan, WangGaofei (Year: 2011).*

(Continued)

*Primary Examiner* — Gautam Ubale
(74) *Attorney, Agent, or Firm* — Alston & Bird LLP

(57) ABSTRACT

In a promotion offering system, a consumer is more likely to purchase a promotion offering if the consumer finds the promotion to be interesting or fits a need of the consumer. In order to provide a more intelligent selection process for selecting promotions that are desirable to the consumer, a method and a promotion offering system for implementing the method are provided that takes into consideration a number of different factors associated with a consumer, including locations and deal types that are known or predicted to be of interest to the consumer, when determining one or more promotions to present to the consumer.

12 Claims, 12 Drawing Sheets

(56) References Cited

OTHER PUBLICATIONS

Method and System for Facilitating a Merchant to Electronically Distribute Cooperative Coupons Associated with Promotional Offers to Mobile Devices of Consumers (Year: 2010).*
U.S. Appl. No. 13/411,502, filed Mar. 3, 2012, In re: O'Brien entitled *Relevance System for Consumer Deals*.
U.S. Appl. No. 13/460,745, filed Apr. 30, 2012, In re: Thacker et al. entitled *Sales Enhancement Systems*.
U.S. Appl. No. 61/644,352.

* cited by examiner

PROMOTION OFFERING SYSTEM

CROSS-REFERENCE TO RELATED APPLICATIONS

This application claims the benefit of U.S. Provisional Application No. 61/695,857, filed Aug. 31, 2012, the entire contents of which are hereby incorporated by reference.

FIELD OF THE INVENTION

The present description relates to offering promotions associated with a product or a service. This description more specifically relates to a process, and a system for implementing the process, for utilizing multiple system features in order to select one or more promotions for a consumer that matches the consumer's interest.

BACKGROUND OF THE INVENTION

Merchants typically offer promotions to consumers from time to time in order to generate more business. The promotions offered may be in the form of discounts, deals, rewards or the like. The promotions are presented to consumers with the hope that the consumer will purchase them. However, it may be difficult to accurately select promotions for presentation to the consumer that the consumer will be interested in. Oftentimes, a number of promotions that are irrelevant to the consumer will be presented before a promotion that interests the consumer is presented.

BRIEF SUMMARY OF THE INVENTION

A system and method is disclosed for providing an efficient selection of promotions for presentation to a consumer that is based on a plurality of features.

According to an aspect of the present invention, a method is provided for selecting a promotion for presentation to a consumer in an electronic correspondence, the method comprising: generating an initial determination on whether to present the promotion to the consumer, wherein the promotion is associated with one or more deal types; accessing one or more deal types from a consumer profile of the consumer; determining whether any of the deal types from the consumer profile match any of the deal types associated with the promotion; adjusting the initial determination based on whether any of the deal types from the consumer profile match any of the deal types associated with the promotion, and selecting the promotion for presentation in the electronic correspondence based on the adjusted initial determination.

According to another aspect of the present invention, a method is provided for selecting one or more promotions for presentation to a consumer in an electronic correspondence, the method comprising: accessing a favorite places location from a consumer profile of the consumer; determining a distance of each promotion from a plurality of promotions from the favorite places location; selecting a promotion from the plurality of promotions to include in the electronic correspondence based on the distance of the promotion from the favorite places location.

According to another aspect of the present invention, a method is provided for arranging the results from a search request, the method comprising: receiving search term inputs; performing a search operation based on the search term inputs; returning one or more promotions as a result of the search operation based on the search term inputs, wherein each promotion from the search result is associated with one or more deal types; accessing one or more deal types from a consumer profile or the consumer; determining whether any of the deal types from the consumer profile match any of the deal types associated with the promotions from the search result; arranging the promotions from the search result based on whether any of the deal types from the consumer profile match any of the deal types associated with the promotions from the search result, and presenting the arrangement of promotions from the search result.

According to another aspect of the present invention, a method is provided for arranging the results from a search request, the method comprising: receiving search term inputs; performing a search operation based on the search term inputs; returning one or more promotions as a result of the search operation based on the search term inputs; accessing a favorite places location from a consumer profile of the consumer; determining a distance of each promotion from the search result from the favorite location; arranging each promotion from the search result based on a distance of each promotion from the favorite places location, and presenting the arrangement of promotions from the search result.

According to another aspect of the present invention, an apparatus is provided for selecting a promotion for presentation to a consumer in an electronic correspondence, the apparatus comprising: a storage unit configured to store a consumer profile of the consumer, wherein the consumer profile includes one or more deal types associated with the consumer; and a processor configured to: generate an initial determination on whether to present the promotion to the consumer, wherein the promotion is associated with one or more deal types; access the consumer profile and identifying the one or more deal types associated with the consumer; determine whether any of the deal types identified from the consumer profile match any of the deal types associated with the promotion; adjust the initial determination based on whether any of the deal types identified from the consumer profile match any of the deal types associated with the promotion, and select the promotion for presentation in the electronic correspondence based on the adjusted initial determination.

According to another aspect of the present invention, an apparatus is provided for selecting one or more promotions for presentation to a consumer in an electronic correspondence, the apparatus comprising: a storage unit configured to store a consumer profile of the consumer, wherein the consumer profile includes one or more favorite places locations associated with the consumer; and a processor configured to: access a favorite places location from the consumer profile; determine a distance of each promotion from a plurality of promotions from the favorite places location; select a promotion from the plurality of promotions to include in the electronic correspondence based on the distance of the promotion from the favorite places location.

According to another aspect of the present invention, an apparatus is provided for arranging the results from a search request, the apparatus comprising: a storage unit configured to store a consumer profile of a consumer, the consumer profile including one or more deal types associated with the consumer; an interface configured to receive search term inputs; a processor configured to: perform a search operation based on the search term inputs; return one or more promotions as a result of the search operation based on the search term inputs, wherein each promotion from the search result is associated with one or more deal types; access one or more deal types from the consumer profile; determine whether any of the deal types from the consumer profile match any of the deal types associated with the promotions from the search result; arrange the promotions from the search result based on whether any of the deal types from the consumer profile match any of the deal types associated with the promotions from the search result, and control a presentation of the arrangement of promotions from the search result.

According to another aspect of the present invention, an apparatus is provided for arranging the results from a search request, the apparatus comprising: a storage unit configured to store a consumer profile of a consumer, the consumer profile including one or more favorite places locations associated with the consumer; an interface configured to receive search term inputs; a processor configured to: perform a search operation based on the search term inputs; return one or more promotions as a result of the search operation based on the search term inputs; access a favorite places location from the consumer profile; determine a distance of each promotion from the search result from the favorite location; arrange each promotion from the search result based on a distance of each promotion from the favorite places location, and control a presentation of the arrangement of promotions from the search result.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE SEVERAL VIEWS OF THE DRAWING(S)

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Figure 1:
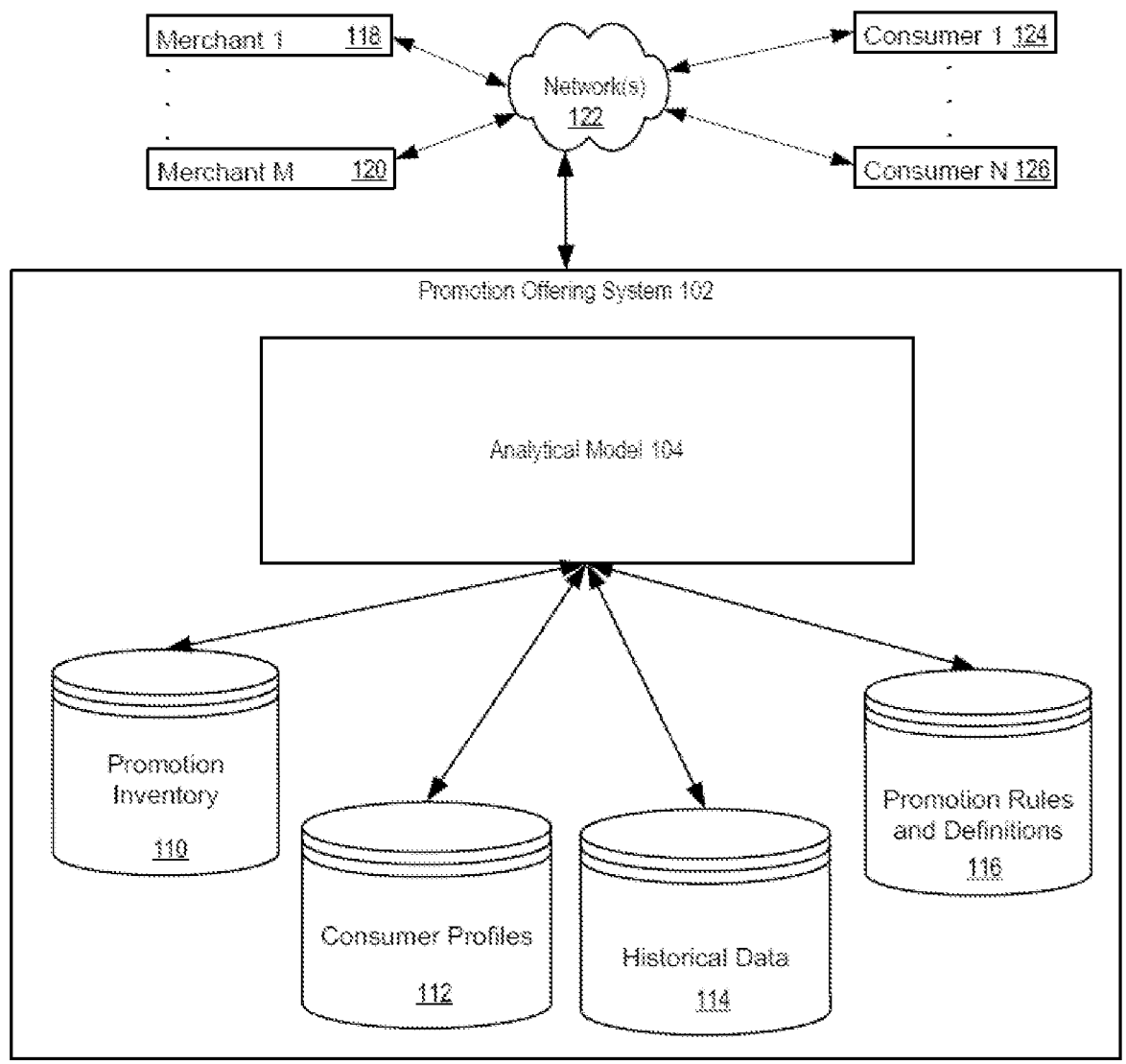
FIG. 1 illustrates a representation of a promotion system for intelligently selecting promotions for presentation to consumers in the promotion system.

The present invention relates to a promotion system, such as the promotion system 100 illustrated in FIG. 1, where merchants are able to offer promotions on their products (e.g., goods, meals, trips, etc.) and/or services to the promotion system, the promotion system performs an analysis based on a variety of factors to select promotions for presentation to consumers within the promotion system, and the consumers receive promotions that are predicted to be of interest to the consumer from the analysis. Further descriptions of the present invention are provided in more detail below.

A promotion in the promotion system 100 may include any type of reward, discount, coupon, credit, deal, voucher or the like used toward part (or all) of the purchase of a product or a service. The promotion may also include merchandise goods that are being offered for sale. For instance, goods promotions may include offers for sale of clothing, electronic devices, school supplies, jewelry, sporting goods, kitchen goods, cosmetic goods and the like. The list of possible promotions is not exhaustive, and has been provided for illustrative purposes only. A promotion may essentially be anything that can be offered for sale by a merchant. Promotions may be offered as part of a larger promotion program, or the promotion may be offered as a stand-alone one-time promotion.

In an effort to better distinguish and identify the promotion, the promotion may be identified by one or more attributes, such as the merchant offering the promotion (e.g., "XYZ coffee shop"), the location of the promotion, the amount or price range of the promotion, the category of the promotion (such as a restaurant promotion, a spa promotion, a travel promotion, a local promotion, etc.), the sub-category of the promotion (such as a Japanese restaurant, a Massage promotion, a Caribbean cruise promotion, and a local farmer's market promotion, etc.), amount of discount offered by the promotion, a price range that includes the value of a discount offered by the promotion, time at which the promotion is likely to be purchased by a consumer (e.g., a breakfast meal promotion may have a greater likelihood of being purchased by a consumer in the morning time), time at which the promotion is redeemable (e.g., a breakfast meal promotion may only be redeemable during breakfast hours), time or time period for which the promotion is related to (e.g., a breakfast meal promotion is related to a morning time period), or the like. Any one of the described attributes may then be used to define a corresponding promotion category. The promotion category and/or subcategory may be utilized during a process for selecting one or more promotions to present to the consumer, as will be described in further detail below.

The consumer in the promotion system 100 may be identified by one or more profiles, or sub-profiles, where each profile or sub-profile includes one or more consumer attribute that describes the consumer. Consumer attributes may include, but are not limited to, the consumer's name, consumer's age, consumer's location, consumer's gender, consumer's tenure using the promotion system, consumer's email domain, consumer's IP address, consumer's occupation, consumer's educational background, consumer's previously accepted and/or rejected promotion program offerings, consumer's gender and the like. The consumer attributes may be inputted into the consumer's profile by the consumer, or collected by components within the promotion system 100 and inputted into the consumer's profile.

With respect to a location based consumer attribute, the consumer's profile may identify one or more "favorite places", which are locations associated with the consumer. For example, the "favorite places" that are associated with the consumer may correspond to any one of the locations described in U.S. patent application Ser. No. 13/411,502, incorporated by reference herein in its entirety. The consumer's "favorite places" may include the consumer's home location, work location, favorite neighborhood within a city location, parent's house location, school location, vacation location, and the like. The consumer's "favorite places" may be comprised of locations that are relatively close in proximity to the consumer's home location, but may also extend to non-local places such as past and/or future vacation locations, cities that friends and/or family live in locations, business trip locations and the like. The consumer may input the consumer's favorite places into the consumer's profile. Alternatively, the promotion system 100 may perform an analysis of the consumer's past behavior to determine one or more suggested "favorite places" that may be added to the consumer's profile. In addition, time periods during which the consumer may be located at the corresponding "favorite places" locations may be identified in the consumer's profile, according to the consumer's input. The promotion system 100 may also determine predictions of when the consumer may be located at the consumer's favorite places (based on an analysis on the consumer's past behavior or based on rules associated with the designated "favorite place") and include this information into the consumer's profile, as discussed in more detail below.

The consumer may additionally select one or more specific consumer-focused deal types (DTs) for inclusion in the consumer's profile. The DTs may be defined in one of several ways.

In one embodiment, DTs are defined as a taxonomy different from categories/subcategories. In particular, categories/subcategories are one type of taxonomy or classification, and DTs are another distinct type of taxonomy or classification.

In another embodiment, DTs are defined based on the structure of the taxonomy. For example, categories/subcategories may be defined as a hierarchy with multiple layers. More specifically, the categories/subcategories include at least two levels, one level defining categories and a sub-level defining the subcategories. In contrast, the DTs may be defined as a single layer without multiple levels. More specifically, the DTs may have a horizontal relationship with one another, but not a vertical relationship owing to the single layer hierarchy.

In still another embodiment, the DTs may be defined with respect to, or independent of, categories and/or subcategories. In one aspect, the definition of the DTs may be dependent on a category and/or subcategory. For example, one of the DTs may comprise "adrenaline". The DT for "adrenaline" may be defined based on a look-up table that correlates to particular subcategories, such as the subcategory "hot air balloons", the subcategory "skydiving", the subcategory "scuba diving", etc. In this way, the DTs may be defined based on multiple categories and/or subcategories.

In another aspect, the definition of the DTs may be independent of category and/or subcategory. For example, the DTs may be manually assigned to be associated with one or more certain promotions. The certain promotions, in turn, will be associated to one or more promotion categories. In this way, the assignment of the DTs is not based on a direct correlation with promotion categories or subcategories but rather a direct correlation to one or more promotions that are manually assigned to the DT. Further, a DT may be indirectly associated to promotion categories or subcategories through an association with a corresponding promotion. Similarly, a promotion category or subcategory may not be directly related to a DT, but rather may be related to one or more promotions. The one or more promotions may, in turn, be associated with one or more DTs. In this way a promotion category or subcategory may be indirectly associated with one or more DTs.

In yet another embodiment, the DTs may be based on one or more aspects of the consumer to which the DT is assigned. For example, one or more DTs may also be suggested to be associated with the consumer based on the consumer's past behavior within the promotion system 100. In this way, a DT is distinct from any one promotion category, and serves to define one or more aspects of the consumer. More particularly, the DT is indicative of one or more aspects of the consumer, whereas the categories/subcategories are indicative of one or more aspects of the merchant. For instance, a DT is indicative of a characteristic of the consumer, such as a description of a personality or trait of the consumer, a description of an interest or pursuit of the consumer, and/or a description of an activity or action of the consumer.

In still another embodiment, both the DTs and the categories/subcategories are defined based on the merchant, but defined based on different aspects of the merchant. As discussed above, for example, the category of the promotion may comprise a restaurant promotion, a spa promotion, a travel promotion, a local promotion, and the respective sub-category of the promotion may comprise a Japanese restaurant, a Massage promotion, a Caribbean cruise promotion, and a local farmer's market promotion. In contrast, the DTs may include "family friendly", which may comprise a "family friendly" restaurant, "family friendly" Japanese restaurant, etc. So that the DTs describe an aspect of the merchant which is separate from the category and/or sub-category description.

In yet another embodiment, the DTs are distinguished from categories/subcategories in their application and/or use. For example, the DTs may be assigned to a promotion in a different way from the assigning of the category/subcategory of the promotion. As another example, the DTs may be used in a different way from the category/subcategory in determining whether to present the promotion to the consumer. More specifically, the category/subcategory may be used in one step (such as the initial estimate of the probability of acceptance of the promotion) and the DTs may be used in another step (such as to determine a correction factor), as discussed in more detail below.

A DT may include, for example, a food interest group, outdoors interest group, home improvement interest group, children's related interest group, pampering and leisure interest group, pet enthusiast's interest group, healthy life style interest group, extreme sports interest group, traveling interest group, music and concert interest group and car enthusiast interest group among others. The examples given for DT are merely for illustration purposes. Other DTs are contemplated.

In order to use DTs for selecting promotions, the promotions may be assigned or associated with one or more DTs (such as by assigning a tag indicating an association to a corresponding DT). The promotion may be associated with a DT either automatically or manually. For example, the promotion offering system 102 may automatically assign a DT based on one or more attributes descriptive of the promotion and one or more attributes descriptive of the DT. More specifically, a promotion may be associated with a DT if the promotion shares one or more same, or similar, attributes as the DT. In this way, the promotion offering system 102 is able to tailor the presentation of promotions to the consumer by selecting promotions that are tagged with one or more DTs that match the DTs of the consumer, as described in more detail below.

The DTs that are selected by the consumer, or suggested by the promotion offering system 102, may be incorporated into the consumer's profile. The associated DT information from the consumer profile may then be referenced when determining one or more promotions to present to the consumer, as described below.

The promotion offering system 102 is configured to offer the consumer one or more promotions. The offer of the promotion may be in an electronic correspondence, which may take the form of an email, SMS text message, webpage inbox message, VOIP voice message, real-time webpage content presentation, mobile push notifications or other similar types of electronic correspondences. Depending on the type of electronic correspondence, the electronic correspondence may be presented to the consumer via a push (e.g., email) or pull (e.g., webpage).

In previous promotion systems consumers have been presented with an unintelligent mix of promotions that included promotions of little interest to the consumer. However, using DTs enables intelligent selection of the promotions to present to the consumer. For example, the promotion offering system may utilize one or more of the promotion and consumer attributes, promotion categories/sub-categories, consumer profile, consumer-focused deal type and the like. In so doing, the consumer is more likely to be interested in the presented promotions.

The electronic correspondence may include one or more promotions that are intended to be viewed by a specific consumer. In order for the promotion offering system 102 to select the one or more promotions for the electronic correspondence, the promotion offering system 102 may determine whether to offer promotion(s) to the specific consumer. For instance, the promotion offering system may determine whether to present promotion(s) by assigning a score according to any one of the methods disclosed in U.S. patent application Ser. No. 13/411,502 and U.S. Provisional Patent Application No. 61/644,352, both of which are incorporated by reference herein in their entirety. The promotion score may be, for example, an indication of a probability that the consumer will purchase the respective promotion. In addition or alternatively, the promotion score may be a representation of a relevance the respective promotion has with the consumer. The promotion score may be generated based on a combination of at least one of information identifying consumer and/or promotion attributes, consumer profiles/sub-profiles, consumer focused deal types and information identifying the past performance of promotions.

After promotions are assigned their respective promotion scores, the highest scoring promotions may be selected for inclusion in the electronic correspondence. The number of promotions for inclusion in the electronic correspondence may be set such that only the top number n of promotions having the highest promotion scores are included.

In addition, the electronic correspondence may be generated to have a number of positions within the electronic correspondence. Each position within the electronic correspondence may be designated with a level of desirability. For example, positions that are closer to the top of the electronic correspondence may be assigned a higher level of desirability than positions that are lower down on the electronic correspondence. This is because a consumer that views the electronic correspondence has a greater likelihood of viewing promotions that are displayed at the top of the electronic correspondence than promotions that are displayed closer to the bottom of the electronic correspondence. This behavior is exemplified by a consumer opening up an email and viewing promotions at the top of the email, but then losing interest in the contents of the email as the consumer scrolls progressively down the email. In this way, promotions having higher promotion scores may be assigned to positions within the electronic correspondence that have a higher level of desirability.

Prior processes selected promotions for presentation to a consumer without sufficient relevant information to make an informed selection of promotions. Oftentimes, promotions were selected manually by sales people that did not have access to more focused information related to the promotion and to the consumer. However, using DTs enables better selection of promotions for consumers, as discussed in more detail below.

FIG. 1 illustrates an overview for a promotion system 100 configured to offer promotions for promotion programs. The promotion system 100 includes a promotion offering system 102, which communicates via one or more networks 122 with consumers, such as consumer 1 (124) to consumer N (126), and with merchants, such as merchant 1 (118) to merchant M (120). The network 122 may include one or more wired networks, wireless networks, or combinations thereof. The wireless network may be a cellular telephone network, an 802.11, 802.16, 802.20, or WiMax network.

Further, the network may be a public network, such as the Internet, a private network, such as an intranet, or combinations thereof, and may utilize a variety of networking protocols now available or later developed including, but not limited to TCP/IP based networking protocols.

The promotion offering system 102 includes an analytical model 104 that is in communication with databases 110, 112, 114, 116. The analytical model 104 may include one or more components for accessing information identifying DT(s) that are associated with a consumer, and analyzing promotions within the promotion system 100 in view of the identified DT(s) to determine one or more promotion(s) to present to the consumer.

The analytical model 104 may also include one or more components for accessing information identifying "favorite places" locations from the consumer's profile, and analyzing promotions within the promotion system 100 in view of the "favorite places" locations to determine one or more promotion(s) to present to the consumer.

The analytical model 104 may also include one or more components for accessing past performance data and generating a promotion score for each promotion (with the promotion score being a representation of a probability that a particular consumer will accept the promotion, and/or a representation of a relevance of the promotion to the consumer). The promotion score may then be referenced when determining whether to select the promotion for presentation to the consumer within an electronic correspondence. The promotion score may also be referenced when determining a position within the electronic correspondence to assign to the promotion.

The analytical model 104 may also include one or more components for processing a promotion search request from the consumer. In order to achieve this, the analytical model is capable of receiving the consumer's search term inputs, performing a search of promotions based on the consumer's search term inputs, and presenting the appropriate search results. The analytical model 104 may further adjust the search results based on other factors such as deal types and "favorite places" locations that are associated with the consumer. Further description is provided below.

To perform the various analyses, the analytical model 104 communicates with multiple databases that are part of (or work in conjunction with) the promotion offering system 102 such as a promotion inventory database 110, consumer profiles database 112, historical data database 114 and promotion rules and definitions database 116. With respects to the particular consumer, the analytical model 104 may access the databases 110, 112, 114 and 116 in order to obtain specific information on the particular consumer and the various promotions in the promotion system 100. As described throughout this disclosure, various information (e.g., attribute information, consumer profile, DT, etc.) may be associated or assigned to a promotion and a consumer in the promotion system 100. The obtained information may then be utilized in order to determine whether to select a promotion for presentation to a consumer (e.g., the information is used to generate promotion scores for each promotion with respect to the particular consumer). The obtained information may also be referenced to adjust the generated promotion score, and/or referenced to select one or more promotions for presentation to the consumer.

The promotion inventory database 110 is configured to store data detailing various promotions and promotion programs that are available for offer in the promotion offering system 102. In order to input promotion program information into the promotions program database 110, merchants may optionally communicate via the networks 122 with the promotion offering system 102 to input the information detailing the various promotion program offerings. The promotion inventory database 110 may also include a repository of deals, such as disclosed in U.S. application Ser. No. 13/460,745, incorporated by reference in its entirety. The repository of deals includes one or more promotions that may be available for selection to present to a consumer. When compared to the other promotions in the promotion inventory database 110, the promotions in the repository of deals may be available for a prolonged period of time. For instance, whereas other promotions may typically have a shelf life of 2 months before expiring, promotions in the repository of deals may be allowed to be available until a merchant expressly notifies the promotion system 100 to cease offering the promotion. In this way, even though a particular type of promotion may not be found in the rest of the promotion inventory, the promotion offering system 102 may rely on the repository of deals to consistently have a collection of promotions from which to select from.

In some embodiments, a promotion in the promotion inventory database 110 may be part of a first repository of deals and featured during an initial feature period. As part of the first repository of deals, the promotion may be publicly available for selection and presentation to a consumer in the promotion system 100 during the initial feature period. After the initial feature period passes, the promotion may be included as part of a second repository of deals. However, not all promotions that pass their initial feature period need be selected for inclusion in the second repository of deals. In one embodiment, the deals that are included in the second repository of deals are not publicly available by some (or all) of the consumers.

In selecting a deal to present to the consumer, the analytical model 104 may first examine deals from the first repository of deals (which are currently in the initial period). In the event that a score associated with a deal in the first repository is sufficient to present to the consumer, the analytical model 104 may select the deal for presentation. However, in the event that the analytical model 104 does not find a deal in the first deal repository (e.g., the score for the deals in the first deal repository is below a predetermined threshold), the analytical model 104 may examine deals in the second deal repository. In this way the second repository of deals offers a supplemental inventory of promotions from which the promotion offering system 102 may select promotions for presentation to a consumer.

In some embodiments, the repository of deals may be comprised of multiple deal repositories. For instance, a first repository of deals may include promotions that are offered to consumers for a shorter period of time (such as up to 1 week) and a second repository of deals may include promotions that are offered to consumers for a longer period of time (such as up to 6 months). In some embodiments, the second repository of deals may be stored in any one of the other databases 112, 114, 116, or alternatively stored as part of a separate database not illustrated.

The consumer profiles database 112 includes profiles for the consumers, consumer 1 (124) to consumer N (126), that are included in the promotion system 100. The consumer profiles may include any combination of the possible information described above. In turn, the information found in a consumer's profile may be referenced as part of an analysis for determining which promotions to present to the consumer.

The historical data database 114 includes information detailing the past performance of promotion offerings that have been presented in the promotion offering system 102 in previous times. The past performance data may include, but is not limited to, rates of acceptances of specific promotion programs, revenue generated from the sale of each promotion, attributes of consumers that accepted or rejected specific promotion programs, and the like. The historical data database 114 may also include information detailing the past behavior of a specific consumer. For instance, the historical data database 114 may include information detailing a past promotion purchasing history for the consumer. The past promotion purchasing history may identify amounts spent by the consumer, times at which the consumer bought promotions, merchants from whom the consumer bought from, locations from which the consumer bought, locations of the promotions the consumer bought, distance of the promotion from the consumer when the consumer bought, and the like.

The promotion rules and definitions database 116 includes information detailing, for example, rules to be applied during the analysis for selecting one or more promotions for presentation to the consumer. A rule may be applied during the selection of the one or more promotions that determines a specific time period during which the consumer is to be presented with the selected promotion(s). For instance, a rule may state that the consumer is only allowed to be presented with a promotion during times the consumer is located, or predicted to be located, at one of the consumer's "favorite places" locations.

A rule may also be applied during the selection of the one or more promotions that determines a type of promotion that is presented to the consumer based on the location, or predicted location, of the consumer. For instance, the consumer's location may be known (e.g., the consumer checks into a "favorite place", or by a default consumer "favorite places" location). The consumer's current location may also be predicted by the promotion offering system 102, for example, according to information identifying previous times at which the consumer was located at a particular "favorite places" location. In either case, the consumer's location, either known or predicted, may be associated to a "favorite place" identified in the consumer's profile. The "favorite place" will in turn be identified as being associated with one or more attributes, and in turn the associated attributes may be referenced to select one or more promotions that share the one or more attributes of the current "favorite place" location of the consumer.

Alternatively or in addition, a rule may state that the consumer may be presented with a promotion offering when the consumer's profile is detected to have been changed or updated. This rule may act as a trigger for initiating a new search for and/or a new presentation of promotions to the consumer when the promotion offering system 102 detects an amendment to an existing consumer profile (e.g., amending of or adding to the existing consumer profile) or the creation of a new consumer profile. The promotion(s) that are selected for presentation to the consumer may further be associated with the new input (e.g., new "favorite place", or new deal type that the consumer has indicated is interested in) into the consumer's profile. For instance, a new deal type that is inputted into the consumer's profile may be detected by the promotion offering system 102, and this input may trigger the promotion offering system to select one or more promotions related to the new deal type to present to the consumer. The presentation of the newly selected promotion(s) may be immediate, or alternatively may be at a later previously scheduled time.

The promotion rules and definition database 116 also includes information detailing, for example, definitions for each of the consumer focused deal types described above. As described above, each deal type may be defined based on one or more promotion attribute or promotion category/subcategory. For instance, a food interest deal type may be associated with restaurant promotions, wine tasting promotions, cooking class promotions, tickets to a cooking show promotion, kitchen goods promotions and the like based on one or more promotion attribute or category/subcategory. In this way, the DT attributes for the food interest deal type may be defined to identify a plurality of promotions from across a plurality of promotion categories to tag as being associated with the food interest deal type. The consumer may then select the food interest deal type as an interest. Moving forward, promotions that are tagged with the food interest deal type may be given a reward factor (e.g., adjust the promotion score to a greater value), thus increasing a probability that the promotion will be selected for presentation to the consumer.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Figure 2:
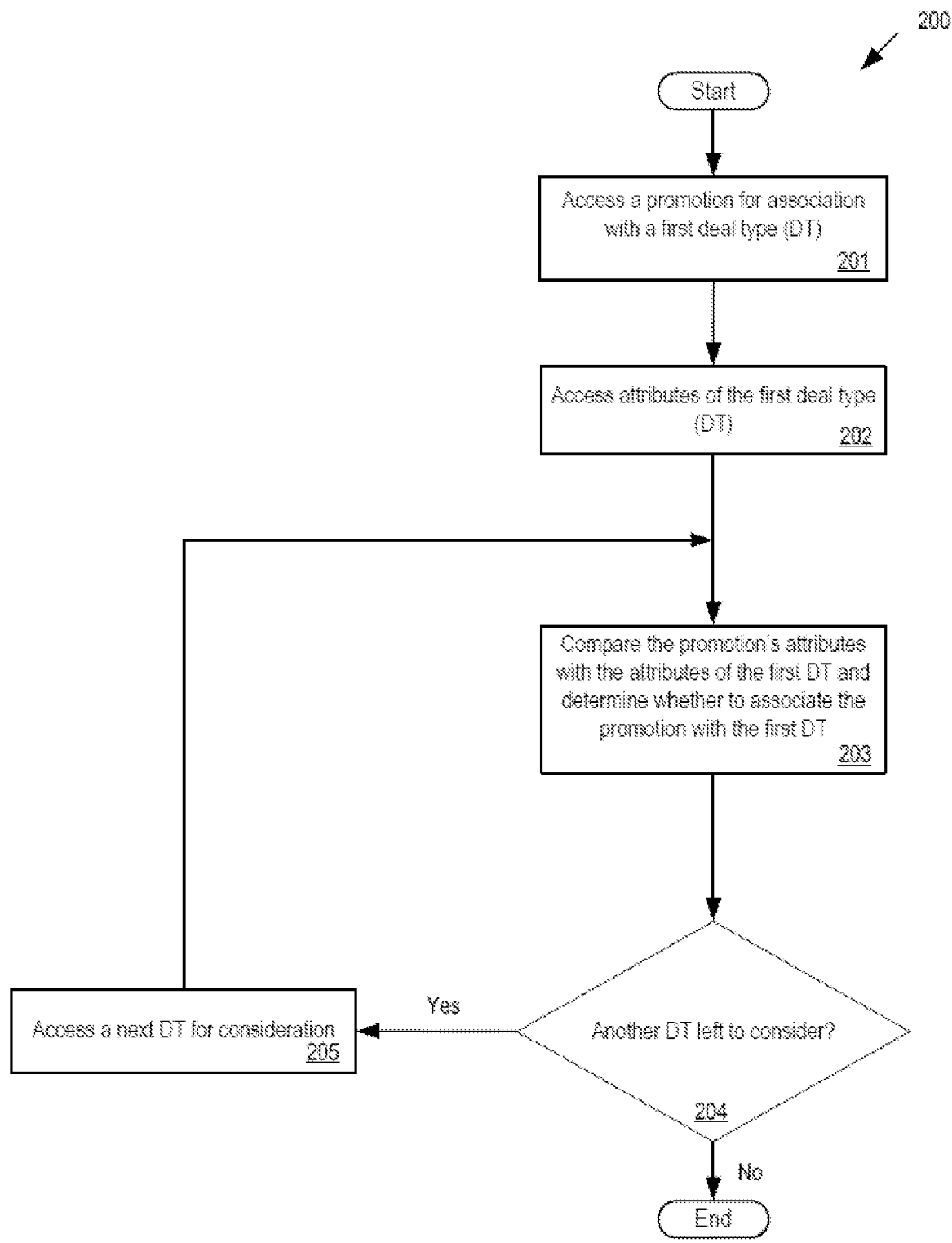
FIG. 2 illustrates a flow chart describing an overview of a process for analyzing a promotion and determining a number of deal type tags to assign to the promotion, according to the present invention.

FIG. 2 illustrates a flow chart 200 describing an overview of a process for analyzing a promotion and determining whether to assign one or more deal type tags to the promotion. Each deal type tag identifies a corresponding deal type that is defined in the promotion system 100, such that each deal type tag that is assigned to the promotion will identify the promotion as being associated with the corresponding deal type.

At 201, a promotion is accessed. Each deal type tag identifies a corresponding deal type, such that each deal type tag that is assigned to the promotion will identify the promotion as being associated with the corresponding deal type. Specifically, at 201 the promotion is accessed in order to determine whether to associate a first deal type (DT) with the promotion. One example of accessing the promotion is to access attributes of the promotion.

At 202, attributes of the first deal type are accessed. An attribute of a deal type may be any information that describes a characteristic of the deal type as described above.

At 203, the promotion's attributes are compared to the attributes of the deal type. At 204, a determination is made whether to associate the promotion with the DT based on the comparison. For instance, the promotion may be associated with the deal type if one or more attributes of the first deal type are found to match up with one or more attributes, categories or any other information describing the promotion. If the deal type is determined to be associated with the promotion, then a deal tag that identifies the deal type is assigned to the promotion.

At 205, a determination is made whether there is another deal type that is defined in the promotion system 100 left to consider for association with the promotion. Each deal type that is considered according to the process described in flow chart 200 may be the result of an input from the consumer. The consumer may input selections of deal types that are of interest to the consumer, which are then include in the consumer's profile. In this way each of the consumer's deal type selections may be considered.

If another deal type is determined to be left for consideration, then at 206 a next deal type is accessed. The next deal type is then considered for association with the promotion at 203.

When there are no longer any deal types left for consideration with respect to the promotion, the process described by flow chart 200 may end. By the end of the process described by flow chart 200, the promotion will be assigned deal tags that identify the deal types that are associated with the promotion.

The process described in flow chart 200 is made for exemplary purposes only. Other variations on the process for assigning the appropriate deal tags to the promotions of promotion system 100 are contemplated. For instance, according to some embodiments, the process may be implemented from the standpoint of a deal type. In these embodiments, a first deal type may be accessed, and then promotions in the promotion offering system 102 may be iteratively accessed to determine all of the promotions that are to be associated with the first deal type (the determination on whether to associate the first deal type with the promotions will be according to what is described at 203). After the promotions that are determined to be associated to the first deal type are assigned the appropriate deal type tag, a next deal type may be accessed.

Alternatively, the deal types may be associated with a promotion using manual input. For example, an operator of the promotion offering system 102 may determine which deal type(s) to assign to a promotion, and tag the promotion accordingly.

Figure 3A:
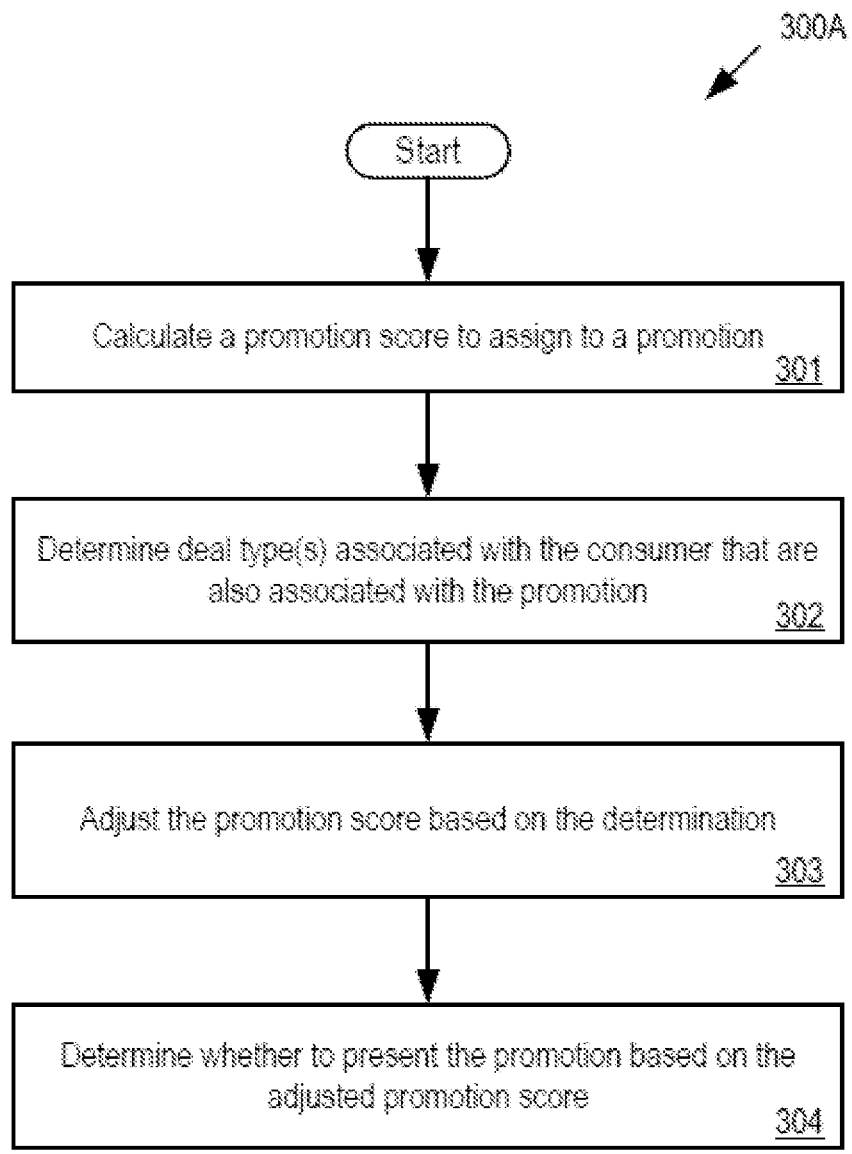
FIG. 3A illustrates a flow chart describing an overview of a process for determining the effect of one or more deal types being associated with a consumer will have during the selection of one or more promotions for presentation to the consumer, according to the present invention.

FIG. 3A illustrates a flow chart 300A describing an overview of a process for determining how the association of one or more deal types with a consumer will affect the selection of one or more promotions for presentation to the consumer. The promotion(s) may be presented to the consumer via transmission (e.g., for an email, SMS text message, etc.) or display (e.g., for a webpage) of an electronic correspondence. The flow chart 300A is described from the standpoint of selecting one or more promotions for including in a new electronic correspondence for presentation to the consumer.

At 301, a promotion is analyzed. The analysis of the promotion may comprise one of many types of calculations. One example of a calculation is to generate a promotion score to assign to the promotion. The promotion score may be calculated according to any one of the methods described above. Examples of promotion scores are described in U.S. patent application Ser. No. 13/411,502, which is incorporated by reference in its entirety.

At 302, the promotion is analyzed to determine one or more deal types that are associated with the consumer and also associated with the promotion. As described above with reference to flow chart 200, a deal type may be associated with a promotion if one or more attributes of the deal type are found to match up with one or more attributes, categories or any other information describing the promotion. The deal type(s) that are associated with the consumer may be accessed from the consumer's profile.

At 303, the promotion score calculated at 301 may be adjusted. The adjustment may be based on several things. For example, the adjustment may be based on the determination of a number of consumer associated deal types that are also associated with the promotion. For instance, the greater the number of consumer associated deal types that are also associated with the promotion may increase the promotion score of the promotion. And conversely, the fewer number of consumer associated deal types that are also determined to be associated with the promotion may decrease the promotion score of the promotion, or at least increase the promotion score to a lesser extent. In this way, the number of consumer associated deal types that are also associated with the promotion may behave as a correction factor on the promotion score that was calculated independently at 301.

Alternatively, the promotion score calculated at 301 may not be specifically tied to an exact number of consumer associated deal types that are also associated with the promotion. Instead, the promotion score may be adjusted based on a relationship between the specific deal type associated with the consumer and the promotion. For example, the promotion score may be adjusted based on a determination of the level of importance by the consumer towards each of the deal types. In particular, some deal types may be more important to the consumer than other deal types. The promotion score may be adjusted based on the level of importance of the specific deal type vis-à-vis to the consumer. Therefore, the absolute number of deal types that are shared by a promotion and the consumer may not be the only factor in determining the adjusted score of the promotion in view of the consumer. For instance, each deal type may further be assigned a level of importance that is selected by the consumer. In this way, the consumer may for example select, and more specifically, rank each of the deal types selected by the consumer. For example, if a first promotion is associated with 2 deal types that are selected by the consumer and a second promotion is associated with only a single deal type selected by the consumer, the second promotion may still have a higher adjusted promotion score than the first promotion if the single deal associated with the second promotion has a higher importance ranking as selected by the consumer than the two deal types that are associated with the first promotion.

In some embodiments, the importance rankings for the deal types associated with the consumer may be determined automatically by the promotion offering system 102. In this way, after each of the deal types that are associated with the consumer are selected, the consumer offering system 102 may determine an importance ranking for each of the selected deal types. For instance, the promotion offering system 102 may reference past performance data related to the consumer in order to assign an importance ranking to each deal type selected to be associated with the consumer. For example, deal types that are more frequently accessed (e.g., consumer purchasing promotions associated to these deal types) by the consumer may be assigned an importance ranking that is higher than an importance ranking assigned to deal types that are less frequently accessed.

FIG. 3A illustrates one example of adjusting the analysis of whether to present a promotion to a consumer based on the deal types. In particular, the adjustment is based on the number of deal types that the consumer shares with the promotion. For example, the promotion score is adjusted more if the consumer shares multiple deal types with the promotion than a single deal type to reflect that more shared deal types increases the likelihood of selection of the promotion to present to the consumer. In an alternate embodiment, the analysis whether to present the promotion to the consumer may be adjusted based on what deal types are shared between the consumer and the promotion. In particular, different deal types may affect the analysis differently. For example, a first deal type, which may be designated by the consumer or the promotion offering system 102 as more important (e.g., as indicated by the importance ranking), may be given a greater weight if matched to the promotion than if a second deal type, which is designated of lesser importance, is matched to the promotion.

At 304, a determination is made whether to present the promotion to the consumer based on the adjusted promotion score from 303. In some embodiments, all promotions having a promotion score greater than a threshold value may be selected for inclusion in the electronic correspondence. In such embodiments, the promotion may be selected for inclusion in the electronic correspondence if the adjusted promotion score at least meets the set threshold value.

In some embodiments, only a set number (e.g., n number) of promotions may be selected for inclusion in the electronic correspondence. In such embodiments, the promotion may be selected for inclusion in the electronic correspondence if the adjusted promotion score is within the top n promotion scores that have been calculated for consideration in the electronic correspondence.

In some embodiments, only promotions that that share at least a set number of deal types with the consumer may be selected for inclusion in the electronic correspondence. For instance, only promotions that are associated with at least one common deal type as the consumer may be selected for inclusion in the electronic correspondence.

Although not expressly illustrated in flow chart 300A, in some embodiments a message may be generated that identifies one or more factors that allowed a promotion in the electronic correspondence to be selected for inclusion. The message may be generated for one or more of the promotions included in the electronic correspondence. A factor may correspond to any one of the determining factors for selecting a promotion for inclusion in the electronic correspondence described as being analyzed at 304 above. The message informs the consumer on why the consumer is receiving a particular promotion offering.

Figure 3B:
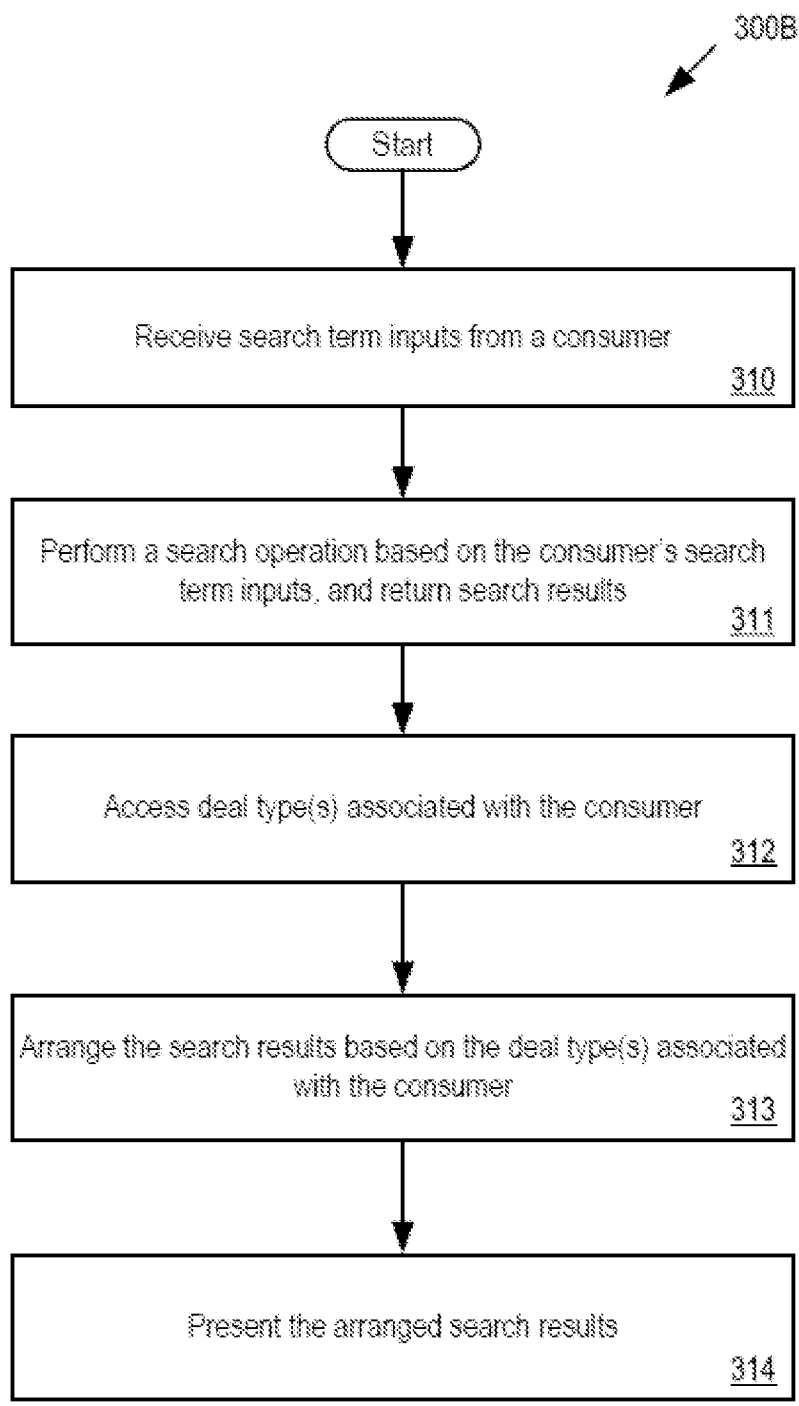
FIG. 3B illustrates a flow chart that describes an overview of a process for arranging the presentation of search results from a consumer's search term inputs based on a number of deal types associated with the consumer, according to the present invention.

FIG. 3B illustrates a flow chart 300B that describes an overview of a process for arranging the presentation of search results from a consumer's search term inputs based on a number of deal types associated with the consumer. Flow chart 300B is described from the standpoint of a consumer executing a pull-type search in which the consumer inputs a search term(s) for locating one or more desired promotions, and in response to the input of search terms, is presented with the search results (e.g., display search results on a webpage).

At 310, a consumer's search term inputs are received. The search term inputs may, for example, be an effort by the consumer to search and find certain promotions within the promotion system 100.

At 311, a search operation is performed based on the consumer's search term inputs. The search results from the search operation are then returned. The search results may, for example, be a list of promotions from the promotion system 100 that matches a certain level of similarity with the description provided by the consumer's search term input. In some embodiments, the consumer's search term inputs may be deal type related in that the search term input indicates a search for promotions that are associated with one or more deal types. According to these embodiments, the search results will return promotions that are associated with the one or more deal types identified in the consumer's search term input.

At 312, deal type(s) that are associated with the consumer are accessed. For instance, the consumer's profile may be accessed to identify the deal type(s) that have been selected by the consumer to be associated with the consumer. According to the embodiments where the consumer's search term input indicates a search for promotions associated with specific deal types, 312 may be skipped as the relevant deal types have already been accessed.

After accessing the deal type(s) that are associated with the consumer, at 313, the promotions from the search result are arranged for presentation based on the deal type(s) that are associated with the consumer. For instance, the arrangement of promotions may be based on the number of consumer associated deal type(s) that that are also associated with a promotion from the search result. The arrangement at 313 seeks to assign promotions from the search result into positions on the medium for presenting the search results (e.g., webpage). Referencing the webpage for illustrative purposes, positions that are higher up on the webpage may have a higher level of desirability than positions on the webpage that are further down. This is because consumer are believed to spend more time viewing promotions that are found higher up on the webpage, and progressively spend lesser time on promotions further down the webpage.

In some embodiments, the number of deal types shared by a promotion from the search result and the consumer may impact the position of the promotion within the arrangement at 313. For instance, from the promotions in the search result, those promotions that are associated with a greater number of deal types that are also associated with the consumer may be assigned to positions in the arrangement with a higher level of desirability (e.g., higher up on the webpage) when compared to those promotions that are associated with a fewer number of deal types that are also associated with the consumer.

In some embodiments, only promotions from the search result that are associated with a threshold number of deal types that are also associated with the consumer may be selected for the arrangement at 313. In this way, it is possible that one or more promotions from the search result may not be included in the arrangement at 313 if a threshold number of associated deal types is not shared with the consumer. For instance, only promotions from the search result that are associated with at least one deal type that is also associated to the consumer may be selected in the arrangement at 313.

Any combination of the rules for arranging the promotions from the search result described above may be implemented at 313.

In addition, some embodiments may apply additional search result arrangement rules that reference an attribute of the consumer. For instance, promotions from the search result may further be filtered such that the arrangement at 313 only includes those promotions associated with a gender that matches the consumer's gender. If the promotions from the search result include a spa promotion that is associated with a female gender, the spa promotion may be included in the arrangement at 313 if the consumer is a female, but may not be included in the arrangement if the consumer is a male. Alternatively, a promotion may not be totally excluded from the arrangement if a gender associated with the promotion does not match the consumer, but the promotion may nonetheless be assigned to a position within the arrangement having a lower level of desirability if the promotion's gender association does not match the gender of the consumer.

Another example of an additional search result arrangement rule that may be further applied after the arrangement of promotions according to any one or more of the deal type related rules, is related to a distance of the promotion from the consumer. Thus according to some embodiments, after arranging the promotions from the search result according to any combination of the deal type related rules above, a distance of the promotion from the consumer may be determined to further adjust the arrangement at 313. For instance, promotions that are closer in distance to the consumer may be assigned to positions in the arrangement that have a higher level of desirability than promotions that are further away in distance from the consumer. The consumer's distance may be referenced, for example, from any one of the consumer's "favorite places" in the consumer's profile.

According to the embodiments where the consumer's search term input indicates a search for promotions that are associated with one or more deal types, the promotions from the search result may be arranged with reference to an attribute of the consumer. For example, the consumer's gender may be accessed from the consumer's profile and the promotions from the search result may be arranged to include promotions that are associated with the consumer's age, while leaving out promotions that are not associated with the consumer's age. Alternatively, promotions that are not associated with the consumer's age may nonetheless be assigned to a position within the arrangement having a lower level of desirability if the promotion's gender association does not match the gender of the consumer.

Another example of arranging the promotions from the search result may be made with reference to the consumer's location. A distance of the promotion from the consumer may be determined to adjust the arrangement at 313. For instance, promotions that are closer in distance to the consumer may be assigned to positions in the arrangement that have a higher level of desirability than promotions that are further away in distance from the consumer. The consumer's distance may be referenced, for example, from any one of the consumer's "favorite places" in the consumer's profile.

Although the consumer attribute corresponding to gender and location have been specifically mentioned, it is contemplated to reference other consumer attributes when arranging the promotions from the search result.

At 314, the arrangement of promotions from the search result is presented. For instance, the promotions from the search result may be displayed according to the arrangement determined at 313 on a webpage for the consumer's viewing.

Although not expressly illustrated in flow chart 300B, in some embodiments a message may be generated that identifies one or more factors that determined the position within the electronic correspondence that was assigned to a promotion in the electronic correspondence. The message may be generated for one or more of the promotions included in the electronic correspondence. A factor may correspond to any one of the determining factors for assigning a position within the electronic correspondence to assign a promotion, as described as being analyzed at 313 above.

Figure 4A:
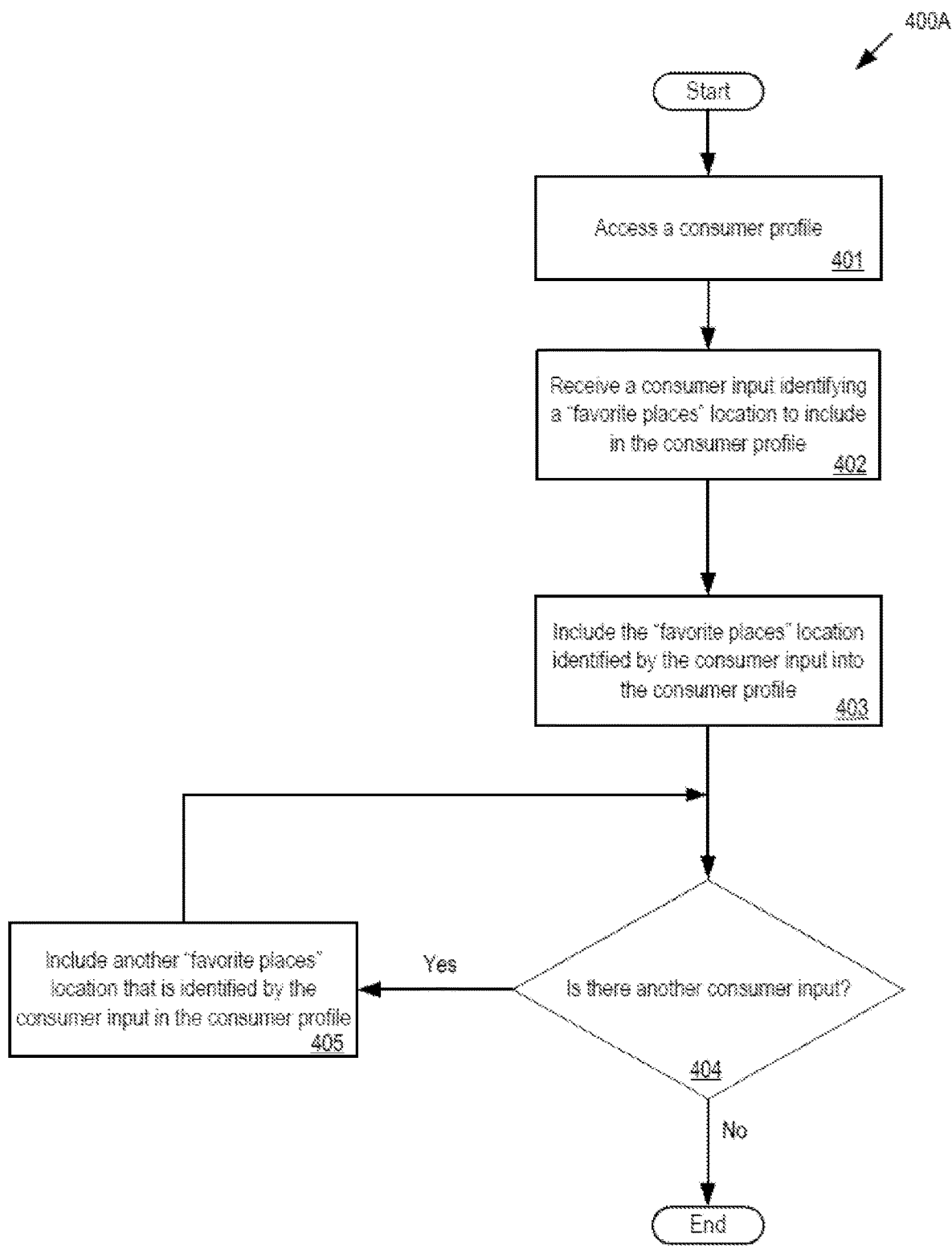
FIG. 4A illustrates a flow chart describing an overview of a process for analyzing an effect of a previous presentation of a promotion to a consumer, according to the present invention.

FIG. 4A illustrates a flow chart 400A describing a process for inputting a consumer's "favorite places" in the consumer's profile.

At 401, a consumer profile of a consumer is accessed.

At 402, a consumer input is received from the consumer that identifies a "favorite places" for inclusion in the consumer's profile.

At 403, the "favorite places" that is identified by the consumer input is included in the consumer profile.

At 404, a determination is made whether there is another consumer input. The consumer input may identify another "favorite places" that the consumer desires to include in the consumer profile.

If another consumer input is received at 404, then at 405 the new "favorite places" identified by the consumer input is included in the consumer profile.

By following the process described in flow chart 400A, the consumer may input one or more "favorite places" into the consumer's profile.

Figure 4B:
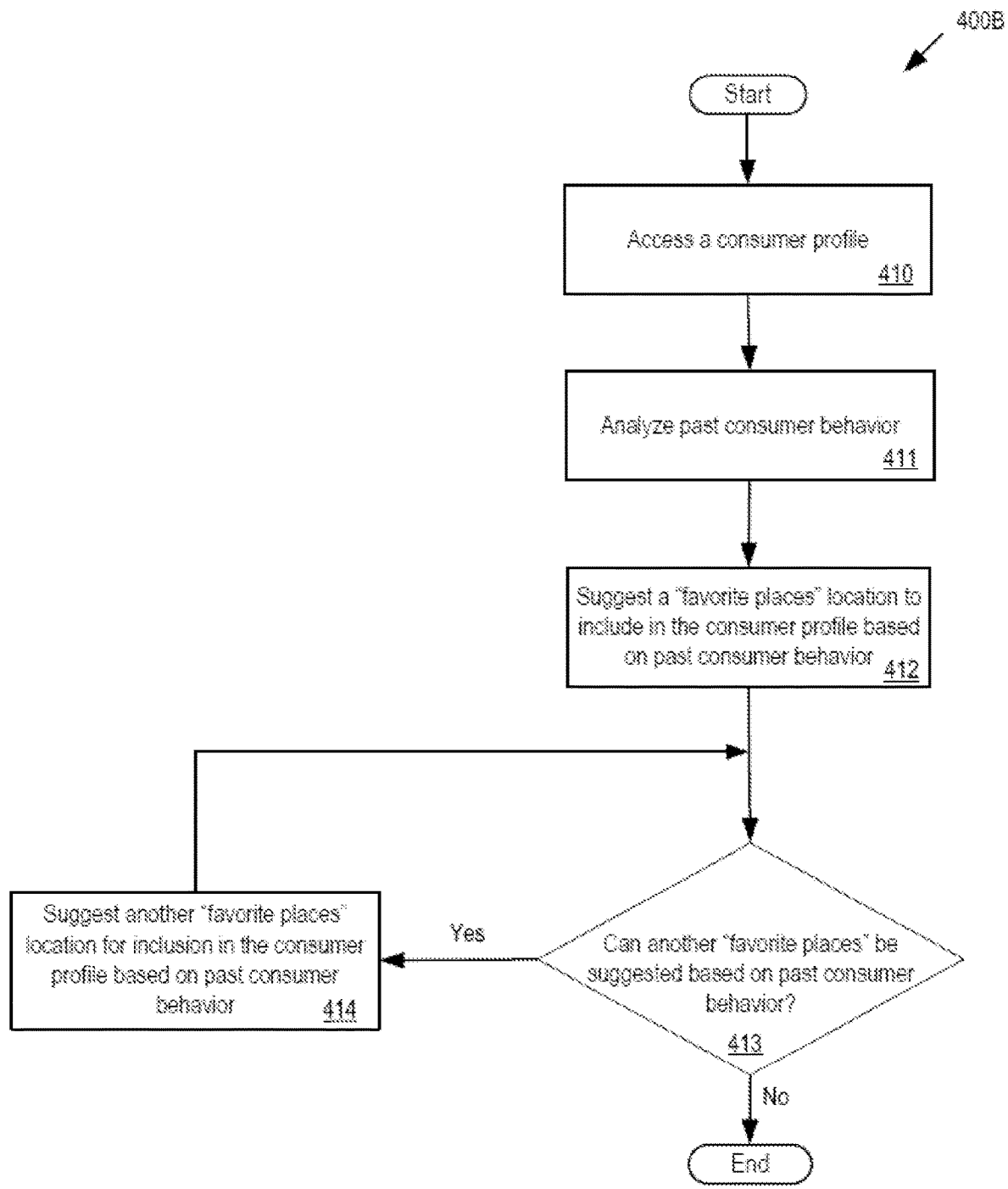
FIG. 4B illustrates a flow chart describing a process for inputting a consumer's "favorite places" location in the consumer's profile, according to the present invention.

FIG. 4B illustrates a flow chart 400B describing a process for suggesting a consumer's "favorite place" based on the past behavior of the consumer. The suggested "favorite places" may then be included in the consumer's consume profile.

At 410, a consumer profile of a consumer is accessed.

At 411, the consumer's past behavior is analyzed. Information describing the consumer's past behavior may be accessed from any one of the databases 110, 112, 114, 116 described within the promotion offering system 102.

At 412, a "favorite place" is suggested for the consumer based on the analysis of the consumer's past behavior at 411. For instance, the consumer's past behavior may indicate that the consumer frequently accesses the promotion system 100 from a certain location in the morning. After analyzing this past behavior, the analytical model 104, for example, may suggest that the consumer add the certain location as a workplace "favorite places". This suggestion may be based on information that indicates the consumer is accessing the promotion system 100 form this certain location consistently at a recognizable time (e.g., morning time that corresponds to the start of a typical workday) and within a recognizable time period (e.g., within the workweek of Monday through Friday). And from this past behavior information, the certain location can be interpreted as the consumer's workplace and a suggestion to include the consumer's workplace as a "favorite place" in the consumer profile may be made at 412. As another example, the analytical model 104 may analyze the consumer's past behavior and notice that the consumer frequently purchases travel deals to a certain city. Then based on this observation of the consumer's past purchasing behavior, a suggestion may be made to include the city as a "favorite place" in the consumer's profile. In this way, any accessible information that describes the consumer's past behavior that is mentioned throughout this disclosure may be referenced to decide on a suggested "favorite place" for the consumer.

In some embodiments, the suggested "favorite place" from 412 may be automatically included in the consumer's profile.

In other embodiments, the consumer may be presented with the choice of whether to include the suggested "favorite place" in the consumer's profile. In this way, the suggested "favorite place" will only be included in the consumer profile if approved by the consumer.

At 413, a determination is made whether the consumer's past behavior can warrant another suggested "favorite place" for the consumer. If another suggested "favorite place" can be made, then at 414 the next suggested "favorite place" is provided based on the consumer's past behavior.

By following the process described in flow chart 400B, suggested "favorite places" that are based on the consumer's past behavior may be included in the consumer's profile.

Figure 5A:
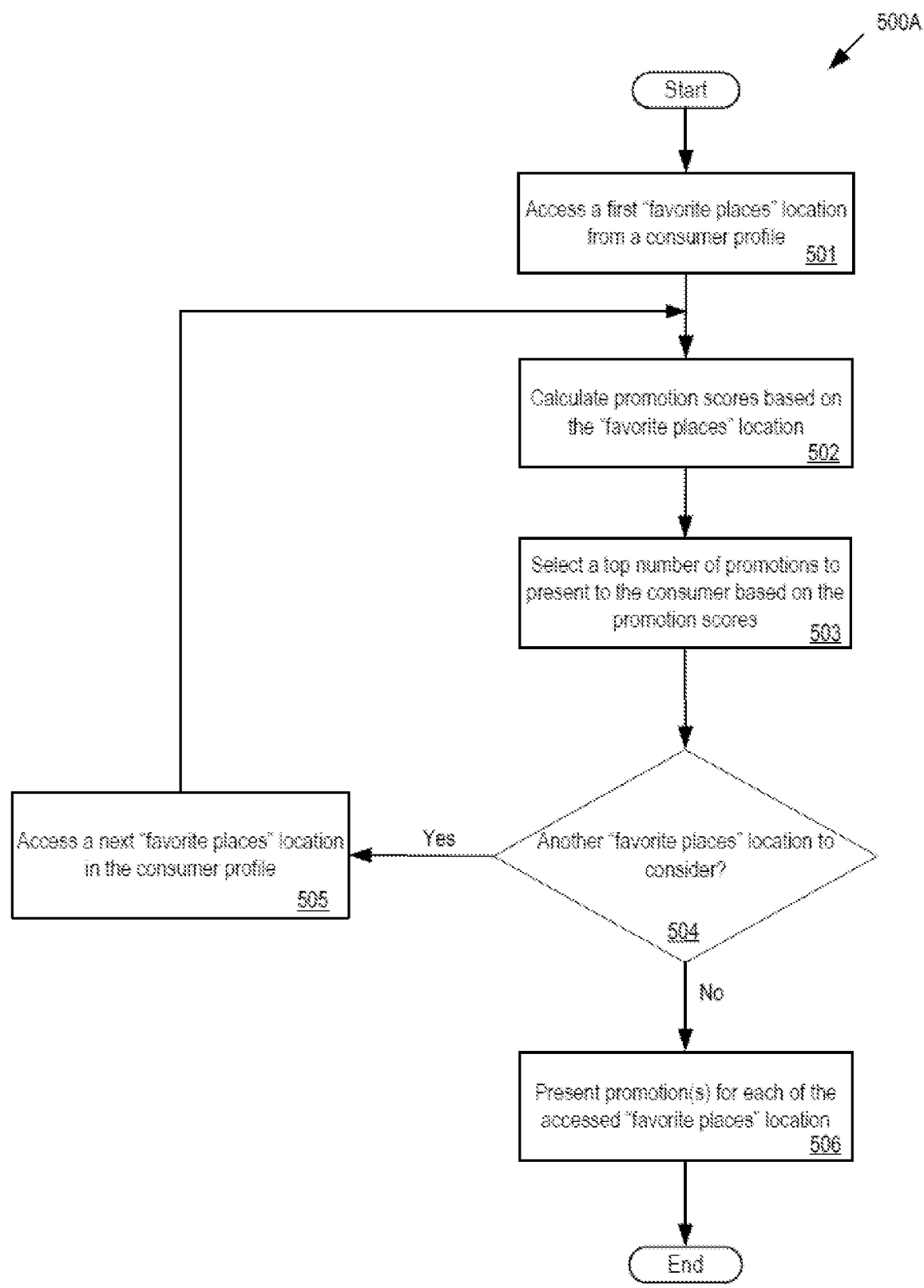
FIG. 5A illustrates a flow chart describing an overview of a process for determining the effect of one or more "favorite places" locations included in a consumer profile will have during the selection of one or more promotions for presentation to the consumer, according to the present invention.

FIG. 5A illustrates a flow chart 500A describing an overview of a process for determining the effect one or more "favorite places" included in a consumer profile may have during the selection of one or more promotions for presentation to the consumer. The selected promotions may be presented to the consumer via transmission (e.g., for an email, SMS text message, etc.) or display (e.g., for a webpage) of an electronic correspondence. The flow chart 500A is described from the standpoint of selecting one or more promotions for including in a new electronic correspondence for presentation to the consumer.

At 501, a first "favorite place" is accessed from a consumer's profile.

At 502, a promotion score for each promotion that is being considered for inclusion in the electronic correspondence is calculated. The promotion score may be calculated according to any one of the methods described above. The promotion score(s) calculated at 502 are based on the first "favorite place" accessed at 501. As one example, promotion scores are based on the distance between the first "favorite place" and the location of the promotion, with a higher score assigned to a shorter distance. As another example, a promotion that is located within a threshold distance from the first "favorite place" may be assigned a promotion score that allows the promotion to be included in the electronic correspondence, whereas a promotion that is not located within the threshold distance from the first "favorite place" may be assigned a promotion score that prevents the promotion from being included in the electronic correspondence. In this way, promotions that are not located within the threshold distance from the first "favorite place" will be excluded from the electronic correspondence.

In some embodiments, a promotion's distance from the first "favorite place" may be directly correlated to the promotion's score calculated at 502. For instance, a promotion's promotion score may be calculated to be progressively higher as the location of the promotion becomes closer to the location of the first "favorite place".

At 503, the promotion scores calculated at 502 are referenced in order to select a top number (e.g., n) of promotions for selection in the electronic correspondence to be presented to the consumer. For instance, the electronic correspondence may be generated to include a predetermined number of promotions. Alternatively, the electronic correspondence may be generated to include a set number of promotions per each "favorite place" that is considered. In either case, the top n number of promotions having the highest promotion scores will be selected at 503 for inclusion in the electronic correspondence with reference to the first "favorite place".

At 504, a determination is made whether there is another "favorite place" in the consumer's profile to consider. If another "favorite place" is found in the consumer's profile, at 505 the next "favorite place" is accessed. Then the process at 502 and 503 are repeated for the next "favorite place". For example, a consumer may have a home "favorite place" and a work "favorite place". Flow chart 500A may iterate for each of "favorite place".

At 506, the promotion(s) selected for each of the accessed "favorite places" are presented to the consumer. If more than one "favorite place" was considered during the process described by flow chart 500A, then each "favorite place" may be assigned its own area in the electronic correspondence. For instance, the top number n of promotions that are selected at 503 with respect to the first "favorite place" may be displayed in a first area in the electronic correspondence dedicated to the first "favorite place". Then, the top m number of promotions that are selected at 503 with respect to the next "favorite place" may be displayed in a next area in the electronic correspondence dedicated to the next "favorite place", and so on.

Although not expressly illustrated in flow chart 500A, in some embodiments a message may be generated that identifies one or more factors that allowed a promotion in the electronic correspondence to be selected for inclusion. The message may be generated for one or more of the promotions included in the electronic correspondence. A factor may correspond to any one of the determining factors for selecting a promotion for inclusion in the electronic correspondence described as being analyzed at 503 above. The message informs the consumer on why the consumer is receiving a particular promotion offering.

Figure 5B:
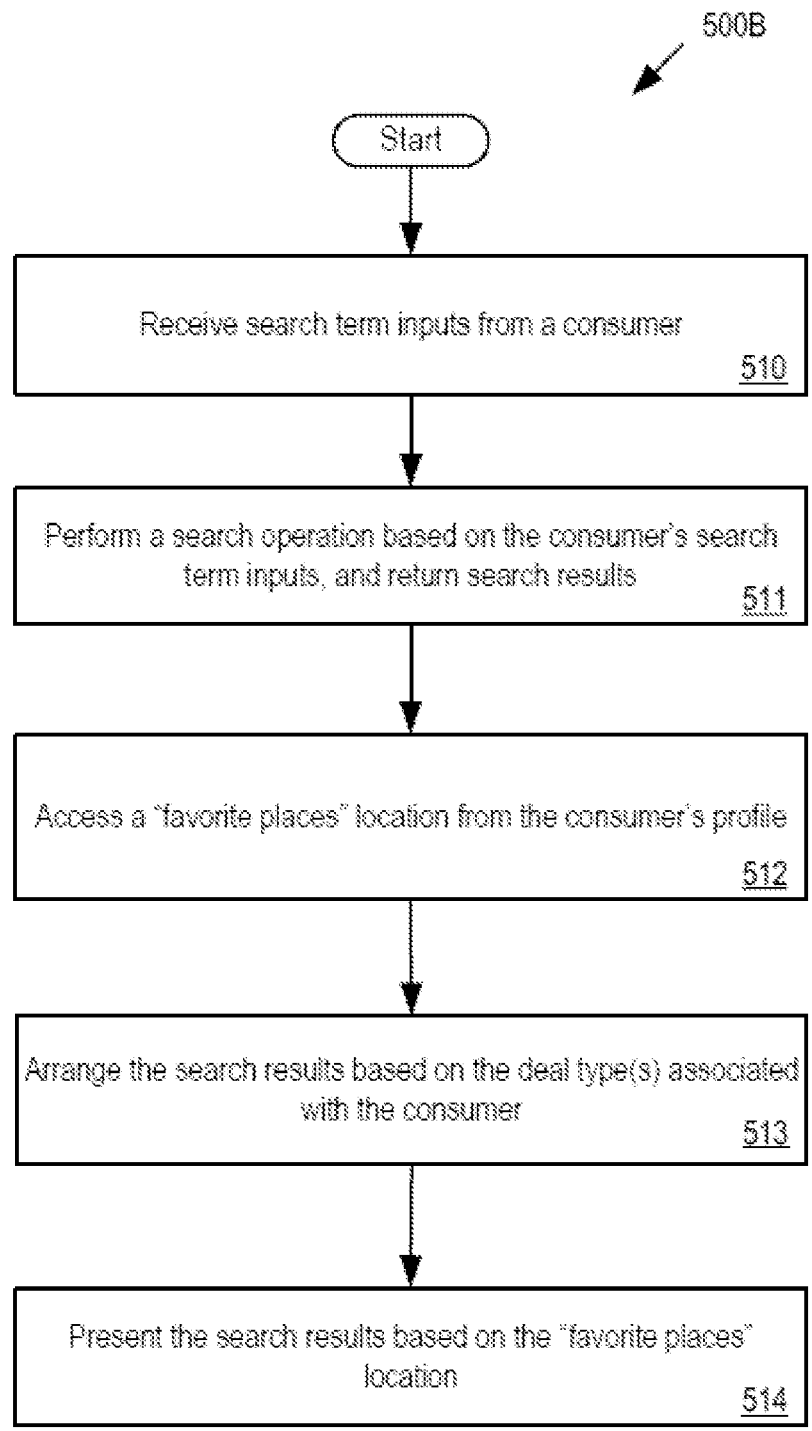
FIG. 5B illustrates a flow chart that describes an overview of a process for arranging the presentation of search results from a consumer's search term inputs based on a number of "favorite places" locations that are associated with the consumer, according to the present invention.

FIG. 5B illustrates a flow chart 500B that describes an overview of a process for arranging the presentation of search results from a consumer's search term inputs based on a number of "favorite places" that are associated with the consumer. Flow chart 500B is described from the standpoint of a consumer inputting a search term for locating one or more desired promotions, and being presented with the search results (e.g., display search results on a webpage).

At 510, a consumer's search term inputs are received. The search term inputs may, for example, be an effort by the consumer to search and find certain promotions within the promotion offering system 102.

At 511, a search operation is performed based on the consumer's search term inputs. The search results from the search operation are then returned. The search results may, for example, be a list of promotions from the promotion system 100 that matches a certain level of similarity with the description provided by the consumer's search term input.

At 512, a "favorite place" is accessed from the consumer profile. For instance, the consumer's profile may be accessed to identify one or more "favorite places" that have been inputted into the consumer profile.

In some embodiments, one of the "favorite places" found in the consumer's profile may be designated as the default "favorite place" that is accessed by default at 512. In such embodiments, the consumer may provide a consumer input to select another "favorite place", either from an existing "favorite place" in the consumer profile or a new "favorite place", which will be accessed at 512.

After accessing the consumer profile in order to obtain the "favorite place", at 513 the promotions from the search result are arranged for presentation based on the "favorite place" that is accessed from the consumer profile. For instance, the arrangement of promotions from the search result may be limited to those promotions that are determined to be within a threshold distance from the "favorite places" location. In this way, those promotions from the search result that are not within the threshold distance from the "favorite place" will not be included as part of the arrangement at 513.

In some embodiments, the arrangement at 513 will seek to assign promotions from the search result into positions on the medium for presenting the search results (e.g., webpage). Referencing the webpage for illustrative purposes, those positions that are higher up on the webpage may have a higher level of desirability than positions on the webpage that are further down. This is because consumer are believed to spend more time viewing promotions that are found higher up on the webpage, and progressively spend lesser time on promotions further down the webpage. By referencing the "favorite place", those promotions from the search result that are closer to the "favorite place" will be assigned to positions on the webpage that have a higher level of desirability than those promotions that are further away from the "favorite place".

In some embodiments, the number of promotions that are presented for the respective "favorite place" may be limited. In such embodiments, the number of promotions from the search results that are included in the arrangement at 513 may be limited to a set number of promotions that are closest to the "favorite place".

Any combination of the rules for arranging the promotions from the search result described above may be implemented at 513.

At 514, the arrangement of promotions from the search result is presented. For instance, the promotions from the search result may be displayed according to the arrangement determined at 513 on a webpage for the consumer's viewing.

Although not expressly illustrated in flow chart 500B, in some embodiments a message may be generated that identifies one or more factors that determined the position within the electronic correspondence that was assigned to a promotion in the electronic correspondence. The message may be generated for one or more of the promotions included in the electronic correspondence. A factor may correspond to any one of the determining factors for assigning a position within the electronic correspondence to assign a promotion, as described as being analyzed at 513 above.

Figure 6A:
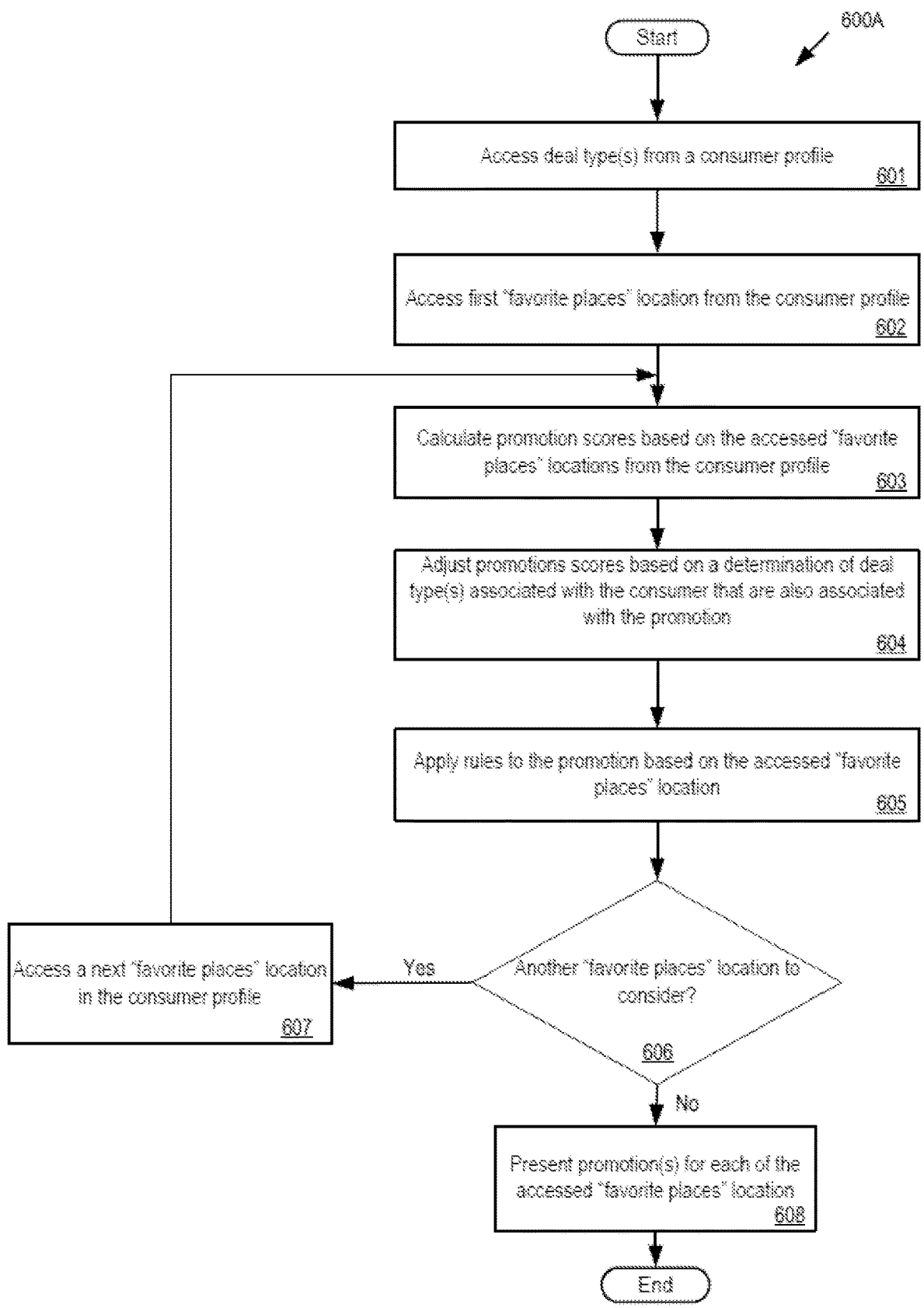
FIG. 6A illustrates a flow chart describing an overview of a process for determining the effect of one or more deal type(s) associated with a consumer and one or more "favorite places" locations included in the consumer's profile will have during the selection of one or more promotions for presentation to the consumer, according to the present invention.

FIG. 6A illustrates a flow chart 600A describing an overview of a process for determining the effect of how a consumer being associated with one or more deal type(s) and one or more "favorite places" will have during the selection of one or more promotions for presentation to the consumer. The selected promotions may be presented to the consumer via transmission (e.g., for an email, SMS text message, etc.) or display (e.g., for a webpage) of an electronic correspondence. The flow chart 600A is described from the standpoint of selecting one or more promotions for including in a new electronic correspondence for presentation to the consumer.

At 601, one or more deal type(s) that are associated with a consumer may be accessed from the consumer's profile.

At 602, a first "favorite place" is accessed from the consumer's profile.

At 603, a promotion score for each promotion that is being considered for inclusion in the electronic correspondence is calculated. The promotion score calculation may be accomplished according to any one of the methods described above. The promotion scores calculated at 603 are based on the first "favorite place" accessed at 602. For instance, a promotion that is located within a threshold distance from the first "favorite place" may be assigned a promotion score that allows the promotion to be included in the electronic correspondence, whereas a promotion that is not located within the threshold distance from the first "favorite place" may be assigned a promotion score that prevents the promotion from being included in the electronic correspondence. In this way, promotions that are not located within the threshold distance from the first "favorite place" will be excluded from the electronic correspondence.

In some embodiments, a promotion's distance from the first "favorite place" may be directly correlated to the promotion's score calculated at 603. For instance, a promotion's score may be calculated to be progressively higher as the location of the promotion becomes closer to the location of the first "favorite place".

At 604, the promotion score calculated at 603 may be adjusted based on the determination of a number of consumer associated deal types that are also associated with each promotion. For instance, the greater the number of consumer associated deal types that are also associated with a promotion may increase the promotion score of the promotion. And conversely, the fewer number of consumer associated deal types that are also determined to be associated with a promotion may decrease the promotion score of the promotion, or at least increase the promotion score to a lesser extent. In this way, the number of consumer associated deal types that are also associated with the promotion may behave as a correction factor on the promotion score that was calculated independently at 603 for each promotion. As discussed above, adjusting the score based on the number of consumer associated deal types that are also associated with the promotion is merely one way to adjust the score based on the deal types. Other adjustments are contemplated.

At 605, one or more rules based on the "favorite place" accessed from the consumer profile may be applied to the promotions. One rule may limit the number of promotions that are selected for inclusion in the electronic correspondence. In this way, only a set number of the highest scoring promotions may be selected for inclusion in the electronic correspondence.

Another rule may limit the number of promotions to be included in the electronic correspondence on a per "favorite place" basis. In this way, the inclusion of promotions in the electronic correspondence may be limited for each "favorite place" such that for each "favorite place" a set number of promotions that are within a threshold distance from the respective "favorite place" may be included.

Another rule that may be applied at 605 is based on the accessed "favorite place". For example, the designation of a type of "favorite place" may implicate rules that designate the promotions selected for the "favorite place" and/or the time period for the promotions selected. For instance, if the "favorite place" is a workplace, a rule may be accessed that electronic correspondences are only to be presented to the consumer during a time period associated with the workplace (e.g., during work hours, 9:00 am to 6:00 pm). Further, if the "favorite place" is a workplace, a rule may be accessed as to the specific categories and/or subcategories from which promotions may be selected. More specifically, with regards to restaurants, a consumer in a workplace typically is interested in lunch restaurants that are quick service. Therefore, the accessed rule may include a plurality of categories and/or subcategories which implicate lunch restaurants that offer quick service. As another example, if the "favorite place" is a home, a rule may be accessed as to the specific categories and/or subcategories (such as spa promotions, dinner promotions) from which promotions may be selected and/or time periods (such as weekday evenings and weekends).

Another rule that may be applied at 605 is also based on the "favorite place" and a time associated with the "favorite place". This rule may only allow promotions that are associated with, or valid during the time associated with, the "favorite places" to be included in the electronic correspondence.

According to the present invention, any combination of one or more of the rules described above with respect to 605 may be applied. Alternatively, according to some embodiments the rules may be optional such that none of the rules may be applied.

At 606, a determination is made whether there is another "favorite place" in the consumer's profile to consider. If another "favorite place" is found in the consumer's profile, at 607 the next "favorite place" is accessed. Then the processes at 603 to 605 are repeated for the next "favorite place".

At 608, the promotions are presented for each of the accessed "favorite places". If more than one "favorite place" was considered during the process described by flow chart 600A, then each "favorite place" may be assigned its own area in the electronic correspondence. For instance, the top n number of promotions that are selected with respect to the first "favorite place" may be displayed in a first area in the electronic correspondence dedicated to the first "favorite place". Then, the top m number of promotions that are selected with respect to the next "favorite place" may be displayed in a next area in the electronic correspondence dedicated to the next "favorite place", and so on.

Figure 6B:
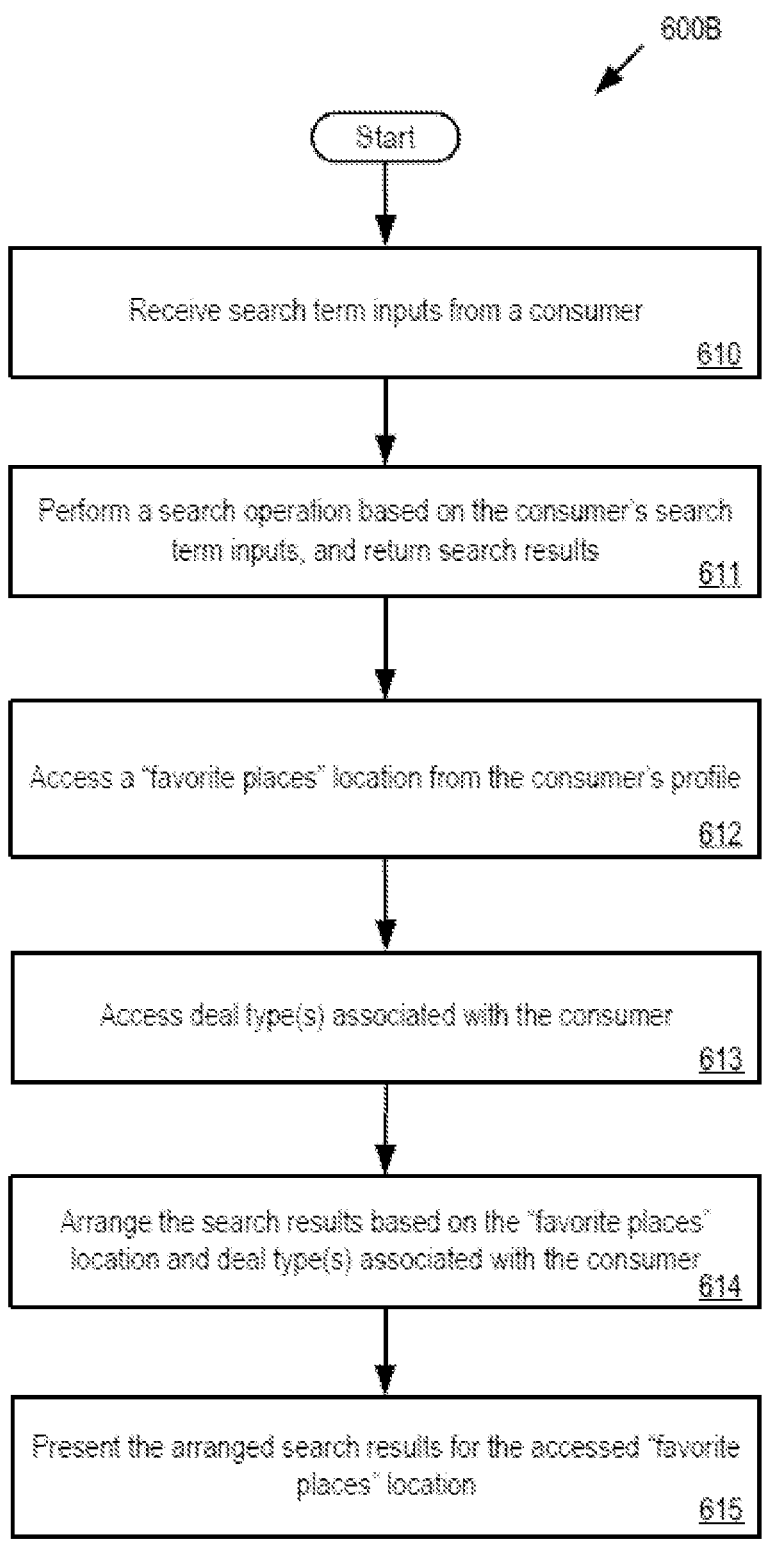
FIG. 6B illustrates a flow chart that describes an overview of a process for arranging the presentation of search results from a consumer's search term inputs based on a number of "favorite places" locations and a number of deal types that are associated with the consumer, according to the present invention.

FIG. 6B illustrates a flow chart 600B that describes an overview of a process for arranging the presentation of search results from a consumer's search term inputs based on a number of "favorite places" and a number of deal types that are associated with the consumer. Flow chart 600B is described from the standpoint of a consumer inputting a search term for locating one or more desired promotions, and being presented with the search results (e.g., display search results on a webpage).

At 610, a consumer's search term inputs are received. The search term inputs may, for example, be an effort by the consumer to search and find certain promotions within the promotion system 100.

At 611, a search operation is performed based on the consumer's search term inputs. The search results from the search operation are then returned. The search results may, for example, be a list of promotions from the promotion system 100 that matches a certain level of similarity with the description provided by the consumer's search term input.

At 612, a "favorite place" is accessed from the consumer profile. For instance, the consumer's profile may be accessed to identify one or more "favorite places" that have been inputted into the consumer profile.

At 613, one or more deal type(s) that are associated with the consumer is accessed. For instance, the consumer's profile may be accessed to identify the deal type(s) that have been selected by the consumer to be associated with the consumer.

After accessing the consumer profile in order to obtain the "favorite place" and the deal type(s) associated with the consumer, at 614 the promotions from the search result are arranged for presentation based on the "favorite place" that and the deal type(s) that are accessed from the consumer profile.

For instance, with respect to the impact the "favorite place" will have on the arrangement at 614, the arrangement of promotions from the search result may be limited to those promotions that are determined to be within a threshold distance from the "favorite place". In this way, those promotions from the search result that are not within the set distance from the "favorite place" will not be included as part of the arrangement at 614.

In some embodiments, the arrangement at 614 will look to assign promotions from the search result into positions on the medium for presenting the search results (e.g., webpage). Referencing the webpage for illustrative purposes, those positions that are higher up on the webpage may have a higher level of desirability than positions on the webpage that are further down. This is because consumer are believed to spend more time viewing promotions that are found higher up on the webpage, and progressively spend lesser time on promotions further down the webpage. Then by referencing the "favorite place", those promotions from the search result that are closer to the "favorite place" will be assigned to positions on the webpage that have a higher level of desirability than those promotions that are further away from the "favorite place".

In some embodiments, the number of promotions that are allowed to be presented for the respective "favorite place" may be limited. In such embodiments, the number of promotions from the search results that are included in the arrangement at 614 may be limited to a set number of promotions that are closest to the "favorite place".

With respect to the impact the accessed deal type(s) will have on the arrangement at 614, the arrangement of promotions may be based on a number of consumer associated deal type(s) that each promotion from the search result is also associated with. The arrangement at 614 looks to assign promotions from the search result into positions on the medium for presenting the search results (e.g., webpage). In some embodiments, the number of deal types shared by a promotion from the search result and the consumer may impact the position of the promotion within the arrangement at 614. For instance, from the promotions in the search result, those promotions that are associated with a greater number of deal types that are also associated with the consumer may be assigned to positions in the arrangement with a higher level of desirability (e.g., higher up on the webpage) when compared to those promotions that are associated with fewer deal types that are also associated with the consumer.

In some embodiments, only promotions from the search result that are associated with a threshold number of deal types that are also associated with the consumer may be selected for the arrangement at 614. In this way, it is possible that one or more promotions from the search result may not be included in the arrangement at 614 if a threshold number of associated deal types is not shared with the consumer. For instance, only promotions from the search result that are associated with at least one deal type that is also associated to the consumer may be selected in the arrangement at 614.

Any combination of the rules for arranging the promotions from the search result described above may be implemented at 614.

At 615, the arrangement of promotions from the search result is presented. For instance, the promotions from the search result may be displayed according to the arrangement determined at 614 on a webpage for the consumer's viewing.

Figure 7:
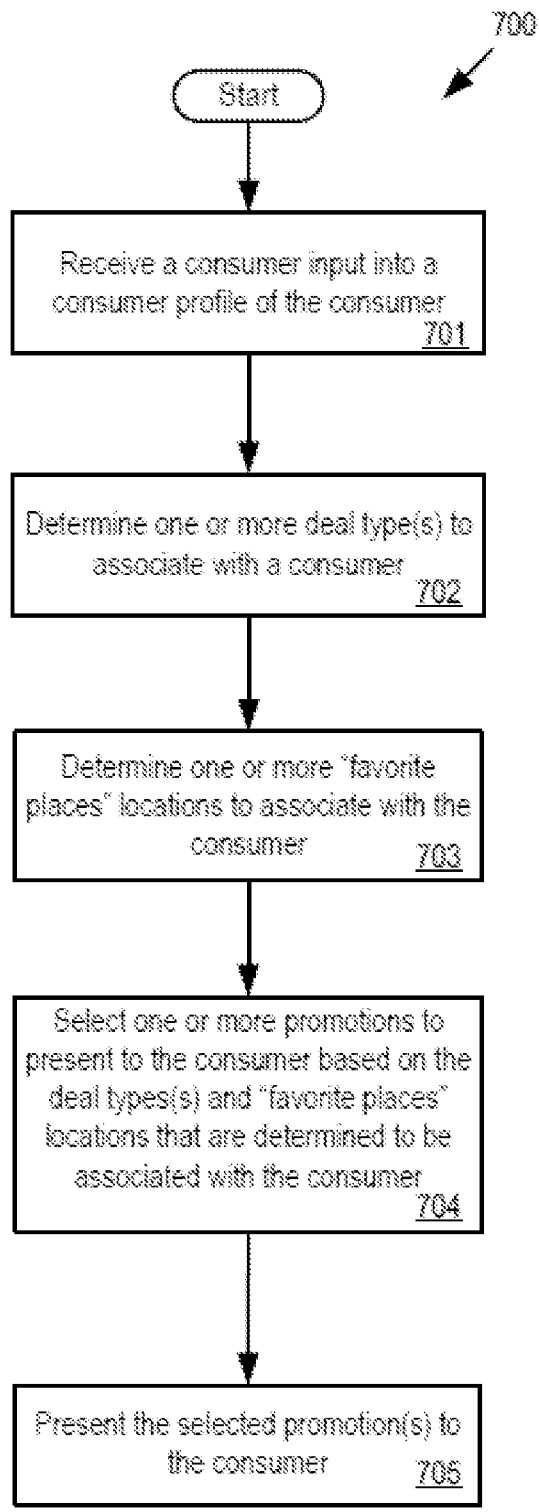
FIG. 7 illustrates a flow chart describing a process for timing a presentation of one or more promotions to a consumer, according to the present invention.

FIG. 7 illustrates a flow chart 700 describing a process for timing a search for one or more promotions and/or a presentation of the one or more promotions to a consumer. The one or more promotions may be presented to the consumer, for example, in the form of an electronic correspondence.

At 701, a consumer's input to the consumer's profile is received. The consumer's input may comprise a creation of the consumer's profile (such as the selection of a home "favorite place" or a work "favorite place", the selection of a deal tag, or the like) or the updating of an existing consumer profile (such as an addition of a "favorite place" or a selection of a new deal tag). The consumer's input may be treated by the promotion offering system 102 as a trigger to perform an immediate search for promotions and to immediately present the results of the search.

In response to the receipt of the consumer's input, at 702, the promotion offering system 102 determines which consumer deal type(s) are included in the consumer profile. As part of 702, the promotion offering system 102 may consider whether the consumer input at 701 included an input of a new deal type(s) into the consumer profile. In particular, in an alternative embodiment, in the instance where the consumer's input comprises a selection of a deal tag (such as an addition of a specific deal tag to an existing consumer profile), the promotion offering system 102 may focus solely on the specific deal tag that is the subject of the consumer's input. In this way, if the consumer has multiple deal tags, the promotion offering system 102 may only use the specific deal tag to the exclusion of other previously entered deal tags.

At 703, a determination of the "favorite places" that are included in the consumer profile is made. As part of 703, the promotion offering system 102 may consider whether the consumer input at 701 included an input of a new "favorite place" into the consumer profile. In particular, in an alternative embodiment, in the instance where the consumer's input comprises a selection of a "favorite place" (such as an addition of a "favorite place" to an existing consumer profile), the promotion offering system 102 may focus solely on a single "favorite place"—namely, the "favorite place" which is the subject of the consumer's input. In this way, if the consumer has multiple "favorite places", such as when the existing consumer profile previously included a "favorite place", the promotion offering system 102 may only use the "favorite place" to the exclusion of other previously entered "favorite places".

At 704, one or more promotions may be selected for presentation to the consumer based on the determinations made at 702 and 703. The selection of promotions for presentation to the consumer at 704 may be in accordance to any one or more of the processes described above with respect to flow charts 200, 300A, 300B, 400A, 400B, 500A, 500B, 600A, and 600B.

At 705, the selected promotion(s) from 704 are included in an electronic correspondence for presentation to the consumer. As discussed above, in some embodiments, the detection of one or more new deal type(s) being input or the detection of one or more new "favorite places" being input triggers the promotion offering system 102 to present (e.g., transmitted or displayed) the electronic correspondence to the consumer. In such embodiments, the new electronic correspondence that is triggered for presentation to the consumer may only take into account the new deal type(s) that were input and/or the new "favorite places" that were input.

In other embodiments, the presentation of the electronic correspondence may be delayed to a later time that meets a periodic presentation time. For instance, the promotion offering system 102 may be configured to present the consumer with an electronic correspondence including one or more promotions at a predetermined time every day (e.g., in the morning). In this case, the presentation of the electronic correspondence at 705 may be delayed until the next predetermined time.

Although not expressly illustrated in flow chart 700, in some embodiments a message may be generated that identifies one or more factors that determined the selection of the one or more promotions for inclusion in the electronic correspondence. The message may be generated for one or more of the promotions included in the electronic correspondence. A factor may correspond to any one of the determining factors for selecting a promotion, as described as being analyzed at 704 above. The message informs the consumer on why the consumer is receiving a particular promotion offering.

Figure 8:
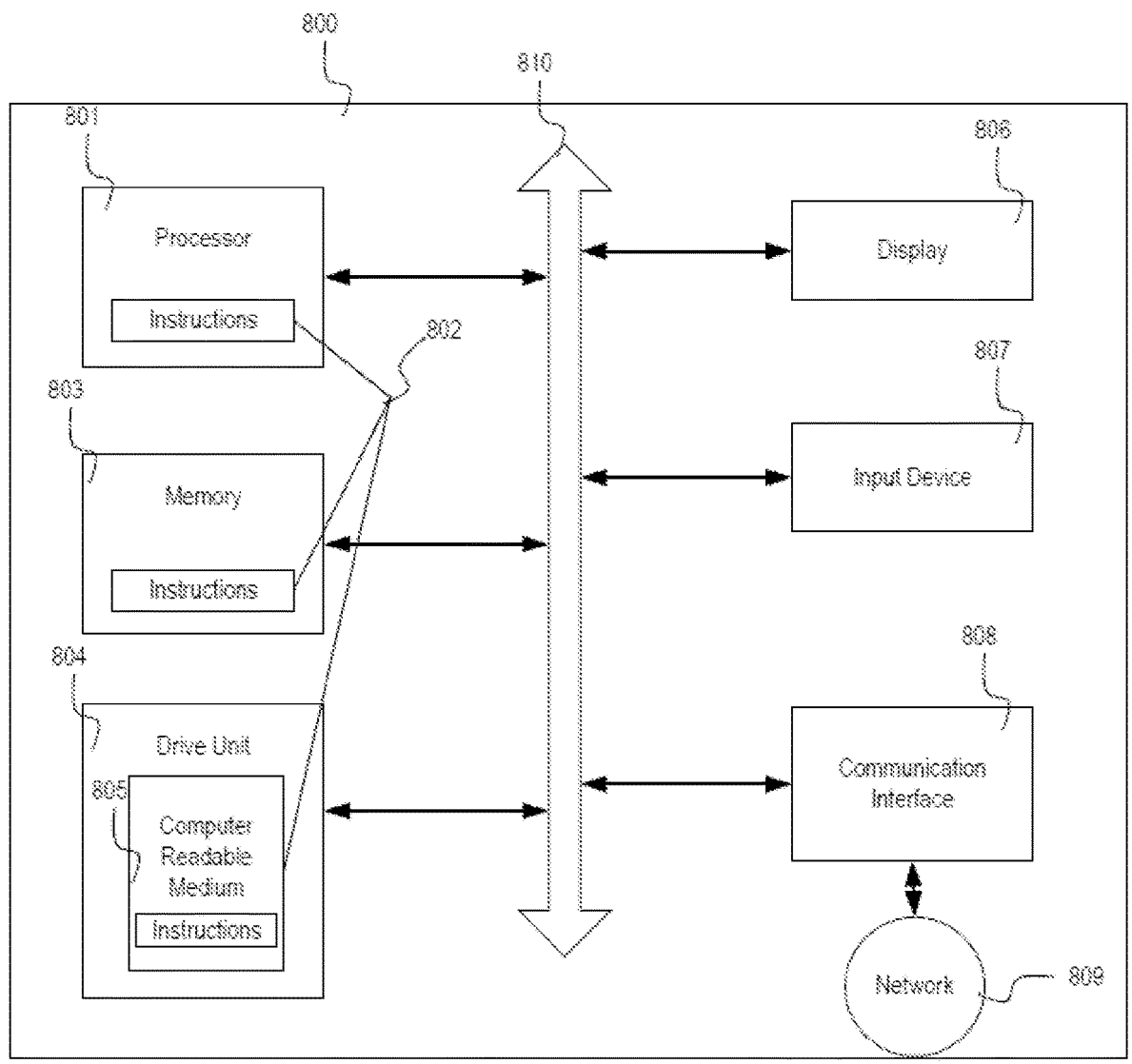
FIG. 8 illustrates a general computer system, programmable to be a specific computer system, which may represent any of the computing devices referenced herein.

FIG. 8 illustrates a general computer system 800, programmable to be a specific computer system 800, which can represent any server, computer or component, such as consumer 1 (124), consumer N (126), merchant 1 (118), merchant M (120), and promotion offering system 102. The computer system 800 may include an ordered listing of a set of instructions 802 that may be executed to cause the computer system 800 to perform any one or more of the methods or computer-based functions disclosed herein. In particular, as illustrated above, FIGS. 2, 3A-3B, 4A-4B, 5A-5B, 6A-6B, and 7 are flow diagrams. The process as illustrated in the flow diagrams may be performed using computer-based functions. The computer system 800 can operate as a stand-alone device or can be connected, e.g., using the network 122, to other computer systems or peripheral devices.

In a networked deployment, the computer system 800 can operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 800 can include a memory 803 on a bus 810 for communicating information. Code operable to cause the computer system to perform any of the acts or operations described herein can be stored in the memory 803. The memory 803 may be a random-access memory, read-only memory, programmable memory, hard disk drive or any other type of volatile or non-volatile memory or storage device.

The computer system 800 can include a processor 801, such as a central processing unit (CPU) and/or a graphics processing unit (GPU). The processor 801 may include one or more general processors, digital signal processors, application specific integrated circuits, field programmable gate arrays, digital circuits, optical circuits, analog circuits, combinations thereof, or other now known or later-developed devices for analyzing and processing data. The processor 801 may implement the set of instructions 802 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing. For example, the set of instructions 102 or other software program may implement the functionality described in flow diagrams illustrated in FIGS. 2, 3A-3B, 4A-4B, 5A-5B, 6A-6B, and 7.

The computer system 800 can also include a disk or optical drive unit 804. The disk drive unit 804 may include a computer-readable medium 805 in which one or more sets of instructions 802, e.g., software, may be embedded. Further, the instructions 802 may perform one or more of the operations as described herein. The instructions 802 may reside completely, or at least partially, within the memory 803 or within the processor 801 during execution by the computer system 800. Accordingly, the databases 110, 112, 114, or 116 may be stored in the memory 803 or the disk unit 804.

The memory 803 and the processor 801 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 800 may include an input device 807, such as a keyboard or mouse, configured for a user to interact with any of the components of system 800. It may further include a display 806, such as a liquid crystal display (LCD), a cathode ray tube (CRT), or any other display suitable for conveying information. The display 806 may act as an interface for the user to see the functioning of the processor 801, or specifically as an interface with the software stored in the memory 803 or the drive unit 804.

The computer system 800 may include a communication interface 808 that enables communications via the communications network 122. The network 122 may include wired networks, wireless networks, or combinations thereof. The communication interface 808 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1 may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. A computer program product, stored on a non-transitory computer readable medium, for generating and returning, in response to receiving a promotions search query from a consumer device, comprising at least a consumer interface, associated with a first consumer, a set of available promotions for offering to the first consumer, via an electronic correspondence transmitted to the consumer device associated with the first consumer, based on a location from which the consumer device accesses a promotion system, the program product comprising:
- a consumer profiles repository configured to store consumer profile data describing each of a group of consumers that includes the first consumer, wherein the consumer profile data includes one or more consumer attributes;
- a promotion inventory repository configured to store promotion data describing each of a group of promotions available to be offered to the group of consumers, wherein the promotion data includes one or more promotion attributes; and
- a deal inventory repository configured to store consumer-focused deal type data describing attributes of each of a group of consumer-focused deal types,
- wherein the promotion data further comprises one or more deal types respectively associated with each of the group of promotions, and wherein the consumer profile data further comprises the one or more deal types respectively associated with each of the group of consumers;
- the program product further comprising instructions that when executed by one or more computers cause the one or more computers to perform operations comprising:
- receiving, by a processor, the promotions search query from the consumer device, wherein the promotions search query comprises at least one search term selected by the first consumer via the consumer interface; and
- in response to receiving the promotions search query, determining, by the processor, from the consumer profiles repository, consumer profile data representing the first consumer and receiving the determined consumer profile data; and
- generating, by the processor, a set of search results using the promotion data stored in the promotion inventory repository, the deal type data stored in the deal inventory repository, and the received consumer profile data, wherein each search result in the set of search results represents a promotion to be offered to the first consumer,
- wherein the received consumer profile data representing the first consumer includes at least one location from which the consumer device accesses the promotion system,
- wherein the at least one location from which the consumer device accesses the promotion system is determined by:
  - identifying, by the processor, based on consumer behavior data stored in the consumer profiles repository, information that indicates the consumer is accessing the promotion system from a particular location consistently at a recognizable time and within a recognizable time period; and
  - automatically modifying, by the processor, the consumer profile data, to include the particular location as the at least one location from which the consumer device accesses the promotion system,
- wherein generating a set of promotions comprises:
- selecting, by the processor, an initial set of promotions based on the promotion data stored in the promotion inventory repository and the received consumer profile data representing the first consumer;
- determining, by the processor, a distance between a promotion location and the at least one location from which the consumer device accesses the promotion system;
- selecting, by the processor, a subset of the initial set of promotions, each of the subset of the initial set of promotions having an associated promotion location within a predetermined distance of the at least one location from which the consumer device accesses the promotion system; and
- generating, by the processor, an electronic correspondence configured to provide the subset of the initial set of promotions to a consumer device, via interactive display as a real-time webpage content presentation, wherein the electronic correspondence is comprised of a plurality of positions, the plurality of positions arranged such that at least one first position is viewable upon opening of the electronic correspondence and at least one or more other positions require scrolling down the electronic correspondence to view,
- the generation of the electronic correspondence comprising: positioning each of a plurality of promotions from the selected subset of the initial set of promotions in accordance with the distance from at least one location from which the consumer device accesses the promotion system, including positioning a first promotion having a shortest distance from at least one location from which the consumer device accesses the promotion system in the at least one first position and a second promotion having a greater distance from at least one location from which the consumer device accesses the promotion system in the at least one or more other positions.

2. The computer program product of claim 1, further comprising generating a presentation of the set of search results for transmission and display via the electronic correspondence.

3. The computer program product of claim 1, wherein the search term is a particular deal type, and generating the set of search results comprises:
  selecting, from the promotion inventory repository, at least one promotion respectively associated with the particular deal type.

4. The computer program product of claim 1, wherein the search term is the at least one location from which the consumer device accesses the promotion system, and generating the set of search results comprises:
  selecting, from the promotion inventory repository, at least one promotion respectively associated with the at least one location from which the consumer device accesses the promotion system.

5. The computer program product of claim 1, wherein generating the set of search results comprises:
  selecting, from the promotion inventory repository, at least one promotion respectively associated with at least one first consumer attribute.

6. The computer program product of claim 1, wherein generating the set of search results further comprises ordering the set of search results.

7. The computer program product of claim 6, wherein ordering the set of search results comprises:
  for each promotion represented by a search result in the set of search results,
  calculating, using the promotion data and the received consumer profile data representing the first consumer, a total of shared deal types respectively associated with both the promotion and the first consumer; and associating the calculated total of shared deal types with the search result; and ordering the set of search results based on their respectively associated totals of shared deal types.

8. The computer program product of claim 6, wherein ordering the set of search results comprises:

for each promotion represented by a search result in the set of search results, calculating, using the promotion data representing the promotion and the received consumer profile data representing the first consumer, a distance between the promotion location and a first consumer location; and associating the calculated distance with the search result; and ordering the set of search results based on their respectively associated distances.

9. The computer program product of claim 8, wherein the first consumer location is the at least one location from which the consumer device accesses the promotion system.

10. A system for returning, in response to receiving a promotions search query from a first consumer, via at least a consumer interface of a consumer device, a set of search results describing promotions to be offered to the first consumer, via an electronic correspondence transmitted to the consumer device associated with the first consumer, based on a location from which the consumer device accesses a promotion system, the system comprising:

a consumer profiles repository configured to store consumer profile data describing each of a group of consumers that includes the first consumer, wherein the consumer profile data includes one or more consumer attributes;

a promotion inventory repository configured to store promotion data describing each of a group of promotions available to be offered to the group of consumers, wherein the promotion data includes one or more promotion attributes; and a deal inventory repository configured to store deal type data describing attributes of each of a group of consumer-focused deal types, wherein the promotion data further comprises one or more deal types respectively associated with each of the group of promotions, and wherein the consumer profile data further comprises the one or more deal types respectively associated with each of the group of consumers; and one or more computers configured to interact with the consumer profiles repository, the promotion inventory repository, and the deal inventory repository and to perform operations comprising:

receiving, by a processor, the promotions search query from the first consumer, wherein the promotions search query comprises at least one search term selected by the first consumer via the consumer interface; and in response to receiving the promotions search query, determining, by the processor, from the consumer profiles repository, consumer profile data representing the first consumer and receiving the determined consumer profile data; and generating, by the processor, a set of search results using the promotion data stored in the promotion inventory repository, the deal type data stored in the deal inventory repository, and the received consumer profile data, wherein each search result in the set of search results represents a promotion to be offered to the first consumer, wherein the received consumer profile data representing the first consumer includes at least one location from which the consumer device accesses the promotion system, wherein the at least one location from which the consumer device accesses the promotion system is determined by:

identifying, by the processor, based on consumer behavior data stored in the consumer profiles repository, information that indicates the consumer is accessing the promotion system from a particular location consistently at a recognizable time and within a recognizable time period; and automatically modifying, by the processor, the consumer profile data, to include the particular location as the at least one location from which the consumer device accesses the promotion system, wherein generating a set of promotions comprises:

selecting, by the processor, an initial set of promotions based on the promotion data stored in the promotion inventory repository and the received consumer profile data representing the first consumer;

determining, by the processor, a distance between a promotion location and the at least one location from which the consumer device accesses the promotion system;

selecting, by the processor, a subset of the initial set of promotions, each of the subset of the initial set of promotions having an associated promotion location within a predetermined distance of the at least one location from which the consumer device accesses the promotion system; and providing the subset of the initial set of promotions to a consumer device, via an electronic correspondence configured to be presented to via an interactive display as a real-time webpage content presentation, wherein the electronic correspondence is comprised of a plurality of positions, the plurality of positions arranged such that at least one first position is viewable upon opening of the electronic correspondence and at least one or more other positions require scrolling down the electronic correspondence to view, the generation of the electronic correspondence comprising: positioning each of a plurality of promotions from the selected subset of the initial set of promotions in accordance with the distance from at least one location from which the consumer device accesses the promotion system, including positioning a first promotion having a shortest distance from at least one location from which the consumer device accesses the promotion system in the at least one first position and a second promotion having a greater distance from at least one location from which the consumer device accesses the promotion system in the at least one or more other positions.

11. The system of claim 10, wherein the search term is a particular deal type, and generating the set of search results comprises:

selecting, from the promotion inventory repository, at least one promotion respectively associated with the particular deal type.

12. The system of claim 10, wherein generating the set of search results comprises ordering the set of search results, and wherein ordering the set of search results comprises:

for each promotion represented by a search result in the set of search results, calculating, using the promotion data and the received consumer profile data representing the first consumer, a total of shared deal types respectively associated with both the promotion and the first consumer; and associating the calculated total of shared deal types with the search result; and ordering the set of search results based on their respectively associated totals of shared deal types.

\* \* \* \* \*